US005757350A

United States Patent [19]

Kanbe et al.

[11] Patent Number: 5,757,350

[45] Date of Patent: May 26, 1998

[54] DRIVING METHOD FOR OPTICAL MODULATION DEVICE

[75] Inventors: Junichiro Kanbe; Kazuharu Katagiri, both of Yokohama, Japan

[73] Assignee: Canon Kabushiki Kaisha, Tokyo, Japan

[21] Appl. No.: 649,469

[22] Filed: May 17, 1996

Related U.S. Application Data

[62] Division of Ser. No. 206,211, Mar. 3, 1994, Pat. No. 5,559,616, which is a division of Ser. No. 79,215, Jun. 21, 1993, Pat. No. 5,296,953, which is a continuation of Ser. No. 919,382, Jul. 29, 1992, abandoned, which is a continuation of Ser. No. 760,504, Sep. 16, 1991, abandoned, which is a division of Ser. No. 390,922, Aug. 8, 1989, Pat. No. 5,092,665, which is a division of Ser. No. 320,798, Mar. 9, 1989, abandoned, which is a continuation of Ser. No. 135,535, Dec. 17, 1987, abandoned, which is a continuation of Ser. No. 691,761, Jan. 15, 1985, abandoned.

[30] Foreign Application Priority Data

| | | | |
|---|---|---|---|
| Jan. 23, 1984 | [JP] | Japan | 59-10503 |
| Jan. 23, 1984 | [JP] | Japan | 59-10504 |
| Dec. 13, 1984 | [JP] | Japan | 59-263662 |
| Dec. 24, 1984 | [JP] | Japan | 59-272357 |

[51] Int. Cl.[6] .......... G06F 3/36

[52] U.S. Cl. .......... 345/97

[58] Field of Search .......... 345/94–97

[56] References Cited

U.S. PATENT DOCUMENTS

| | | | |
|---|---|---|---|
| 4,608,558 | 8/1986 | Amstutz et al. | 345/94 |
| 4,625,204 | 11/1986 | Clerc | 345/95 |
| 4,651,148 | 3/1987 | Takeda et al. | 345/92 |
| 4,655,550 | 4/1987 | Crossland et al. | 345/97 |
| 4,655,561 | 4/1987 | Kanbe et al. | 345/97 |
| 4,715,688 | 12/1987 | Harada et al. | 349/34 |

*Primary Examiner*—Mark R. Powell
*Attorney, Agent, or Firm*—Fitzpatrick, Cella, Harper & Scinto

[57] ABSTRACT

A driving method for an optical modulation device comprising matrix picture elements each formed at intersecting points of scanning lines and data lines between which a bistable optical modulation material represented by a ferroelectric liquid crsytal is interposed. The driving method comprises an erasure step of applying a voltage signal orienting the optical modulation material to the first stable state between the scanning and data lines, at all or a part of the matrix picture elements, and a writing step of sequentially applying a scanning selection signal to the scanning lines and applying an information orientation signal orienting the optical modulation material to the second stable state to the data lines in phase with the scanning selection signal.

6 Claims, 35 Drawing Sheets

DRIVING METHOD FOR OPTICAL MODULATION DEVICE

This application is a division of application Ser. No. 08/206,211, filed Mar. 3, 1994, U.S. Pat. No. 5,559,616 which is a division of application Ser. No. 08/079,215 filed Jun. 21, 1993, now U.S. Pat. No. 5,296,953, which is a continuation of application Ser. No. 07/919,382 filed Jul. 29, 1992, abandoned which is a continuation of application Ser. No. 07/760,504 filed Sep. 16, 1991, abandoned which is a division of application Ser. No. 07/390,922 filed Aug. 8, 1989, now U.S. Pat. No. 5,092,665, which is a division of application Ser. No. 07/320,798 filed Mar. 9, 1989, abandoned which is a continuation of application Ser. No. 07/135,535 filed Dec. 17, 1987, abandoned which is a continuation of application Ser. No. 06/691,761 filed Jan. 15, 1985 abandoned.

BACKGROUND OF THE INVENTION

The present invention relates to a method of driving an optical modulation device, e.g., a liquid crystal device, and more particularly to a time-sharing driving method for an optical modulation device, e.g., a display device, an optical shutter array, etc.

Hitherto, liquid crystal display devices are well known, which comprise scanning lines (or electrodes) and data lines (or electrodes) arranged in a matrix manner, and a liquid crystal compound is filled between the lines to form a plurality of picture elements thereby to display images or information. These display devices employ a time-sharing driving method which comprises the steps of selectively applying scanning selection signals sequentially and cyclically to the scanning lines, and, in parallel therewith selectively applying predetermined information signals to the group of sianal electrodes in synchronism with the scanning selection signals. However, these display devices and the driving method therefor have a serious drawback as will be described below.

Namely, the drawback is that it is difficult to obtain a high density of picture elements or a large image area. Because of relatively high response speed and low power dissipation, among prior art liquid crystals, most of liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In the liquid crystals of this type, molecules of nematic liquid crystal which show positive dielectric anisotropy under no application of an electric field form a structure twisted in the thickness direction of liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode arrangement are designed using liquid crystals of this type, a voltage higher than a threshold level required for aligning liquid crystal molecules in the direction perpendicular to electrode surfaces is applied to areas (selected points) where scanning lines and data lines are selected at a time, whereas a voltage is not applied to areas (non-selected points) where scanning lines and data lines are not selected and, accordingly, the liquid crystal molecules are stably aligned parallel to the electrode surfaces. When linear polarizers arranged in a cross-nicol relationship, i.e., with their polarizing axes being substantially perpendicular to each other, are arranged on the upper and lower sides of a liquid crystal cell thus formed, a light does not transmit at selected points while it transmits at non-selected points. Thus, the liquid crystal cell can function as an image device.

However, when a matrix electrode structure is constituted, a certain electric field is applied to regions where scanning lines are selected and data lines are not selected or regions where scanning lines are not selected and data lines are selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, according as the number (N) of scanning lines increases, a time (duty ratio) during which an effective electric field is applied to one selected point when a whole image area (corresponding to one frame) is scanned decreases with a ratio of 1/N. For this reason, the larger the number of scanning lines are, the smaller is the voltage difference as an effective value applied to a selected point and non-selected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., has already been proposed. However, any method is not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the field of a printer, as means for obtaining a hard copy in response to input electric signals, a Laser Beam Printer (LBP) providing electric image signals to electrophotographic charging member in the form of lights is the most excellent in view of density of a picture element and a printing speed.

However, the LBP has drawbacks as follows:

1) It becomes large in apparatus size.
2) It has high speed mechanically movable parts such as a polygon scanner, resulting in noise and requirement for strict mechanical precision, etc.

In order to eliminate drawbacks stated above, a liquid crystal shutter-array is proposed as a device for changing electric signals to optical signals. When picture element signals are provided with a liquid crystal shutter-array, however, 2000 signal generators are required, for instance, for writing picture element signals into a length of 200 mm in a ratio of 10 dots/mm. Accordingly, in order to independently feed signals to respective signal generators, lead lines for feeding electric signals are required to be provided to all the respective signal generators, and the production has become difficult.

In view of the above, another attempt is made to apply one line of image signals in a time-sharing manner with signal generators divided into a plurality of lines.

With this attempt, signal feeding electrodes can be common to the plurality of signal generators, thereby enabling to remarkably decrease the number of lead wires. However, if the number (N) of lines is increased while using a liquid crystal showing no bistability as usually practiced, a signal "ON" time is substantially reduced to 1/N. This results in difficulties that light quantity obtained on a photoconductive member is decreased, and a crosstalk occurs.

SUMMARY OF THE INVENTION

An object of the invention is to provide a novel method of driving an optical modulation device, particularly a liquid crystal device, which can solve the above-mentioned drawbacks encountered with prior art liquid crystal display devices or liquid crystal optical shutters as stated above.

Another object of the invention is to provide a liquid crystal device driving method which can realize a high response speed.

Another object of the invention is to provide a liquid crystal device driving method which can realize high packaging density of picture elements.

Another object of the invention is to provide a liquid crystal driving method which does not produce crosstalk.

To achieve these objects, there is provided a driving method for an optical modulation device having a plurality of picture elements arranged in the form of a matrix and comprising scanning lines, data lines spaced apart from and intersecting with the scanning lines, and a bistable optical modulation material assuming a first stable state or a second stable state depending on an electric field applied thereto interposed between the scanning lines and the data lines, each of the intersections between the scanning lines and the data lines forming one of the plurality of picture elements; the driving method comprising, an erasure step wherein a voltage signal uniformly orienting the bistable optical modulation material to the first stable state is applied between the scanning lines and data lines constituting all or a part of the plurality of picture elements, and a writing step wherein a scanning selection signal is sequentially applied to the scanning lines, and an information selection signal orienting the bistable optical modulation material to the second stable state in combination with the scanning selection signal is applied to the data lines in phase with the scanning selection signal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

As an optical modulation material used in a driving method according to the present invention, a material which shows either a first optically stable state or a second optically stable state depending upon an electric field applied thereto, i.e., has bistability with respect to the applied electric field, particularly in a liquid crystal having the above-mentioned property, may be used.

Preferable liquid crystals having bistability which can be used in the driving method according to the present invention are chiral smectic C (SmC*)- or H (SmH*)-phase liquid crystals having ferroelectricity. In addition, liquid crystals showing chiral smectic I phase (SmI*), J phase (SmJ*), G phase (SmG*), F phase (SmF*) or K phase (SmK*) may also be used. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcilidene-4'-octylaniline (MBRA8), etc.

When a device is constituted using these materials, the device may be supported with a block of copper, etc., in which a heater is embedded in order to realize a temperature condition where the liquid crystal compounds assume a smectic phase.

Figure 1:
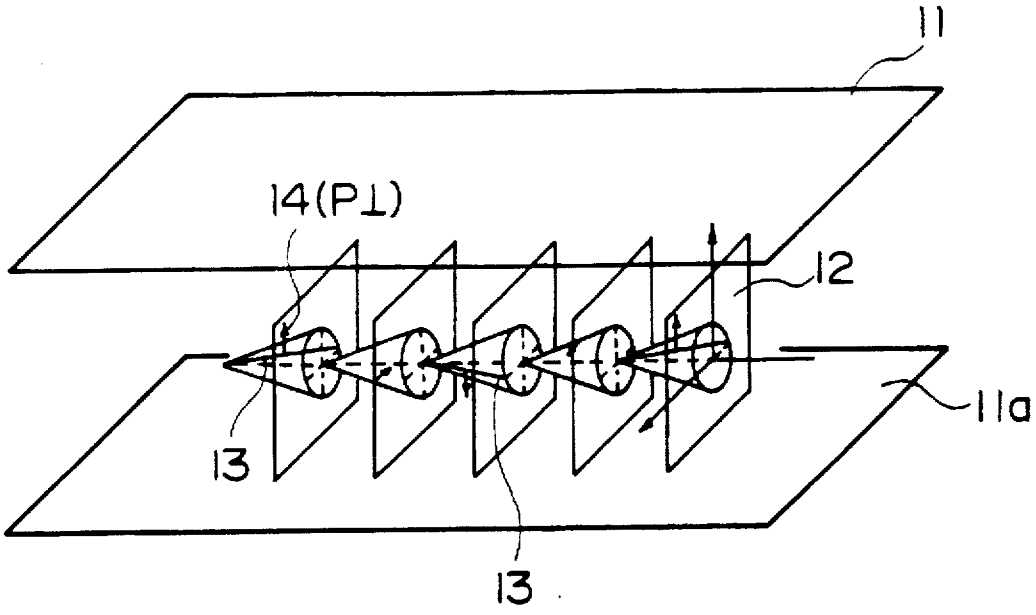
FIGS. 1 and 2 are schematic perspective views illustrating the basic operation principle of a liquid crystal device used in the present invention.
Figure 2:
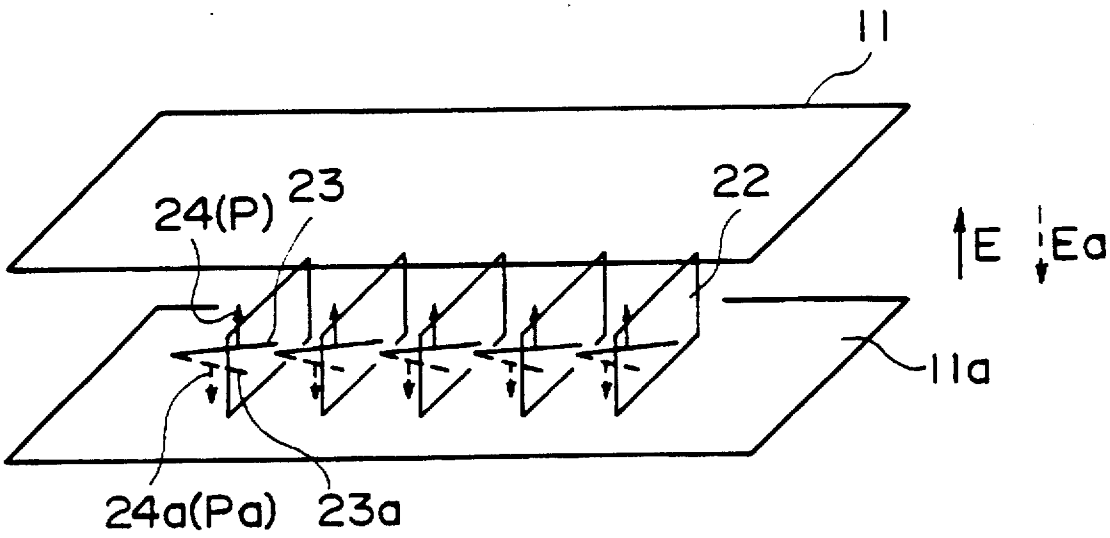

Referring to FIG. 1, there is schematically shown an example of a ferroelectric liquid crystal cell for explanation of the operation thereof. Reference numerals 11 and 11*a* denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11*a*, a helical structure of the liquid crystal molecule 13 is loosened a unwound to change the alignment direction of respective liquid crystal molecules 13 so that the dipole moments (P⊥) 14 are all directed in the direction of the electric field. The liquid crystal molecules 13 have an elongated shape and show refractive anisotropy-between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is loosened even in the absence of an electric field whereby the dipole moment assumes either of the two states, i.e., P in an upper direction 24 or Pa in a lower direction 24*a* as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24*a* depending on the vector of the electric field E or Ea. In correspondence with this, the liquid crystal molecules are oriented in either of a first stable state 23 and a second stable state 23*a*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23*a*, whereby the directions of molecules are changed. This state is also kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

A preferred embodiment of the driving method according to the present invention is explained with reference to FIG. 3.

Figure 3A:
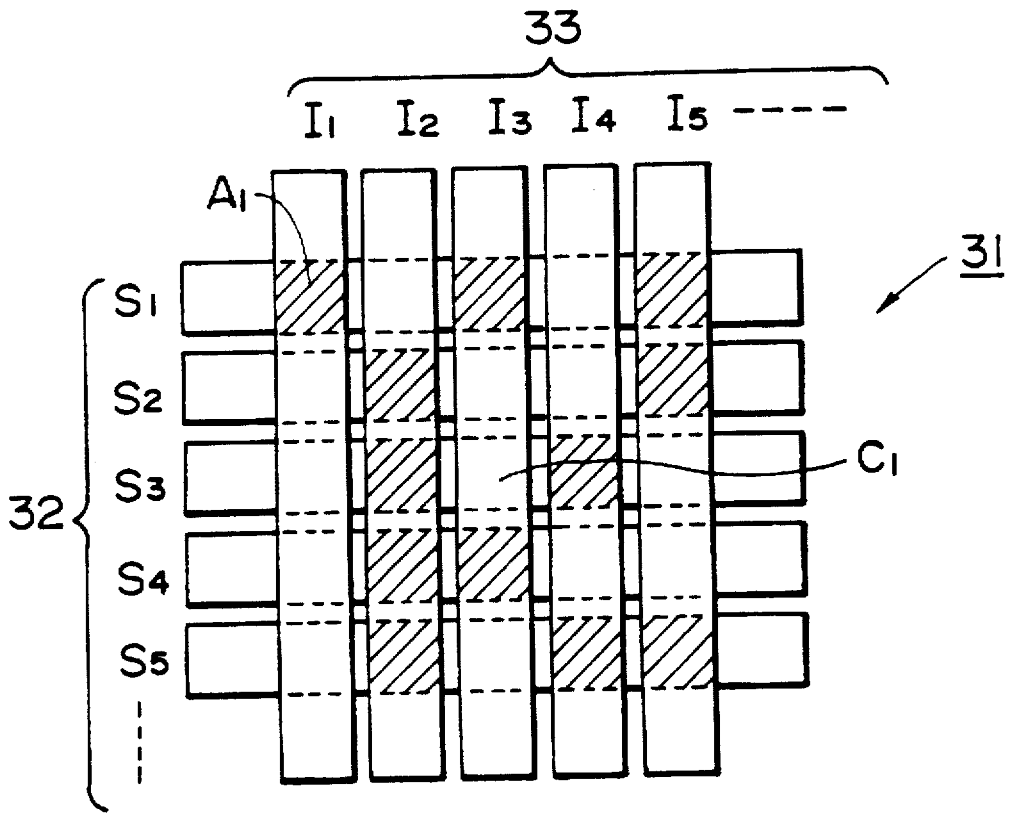
FIG. 3A is a plan view of an electrode arrangement used in the present invention, FIGS. 3B(*a*)–(*d*) illustrate waveforms of electric signals applied to electrodes, FIGS. 3C(*a*)–(*d*) illustrate voltage waveforms applied to picture elements, FIGS. 4A and 4B, in combination, illustrate voltage waveforms applied in time series, FIGS. 5A(*a*)–(*d*) illustrate waveforms of electric signals applied to electrodes in a different example, FIGS. 5B(*a*)–(*d*) illustrate voltage waveforms applied to picture elements in the different example, FIGS. 6A to 10A in combination with FIGS. 6B to 10B, respectively, illustrate different examples of voltage waveforms applied in time series.

FIG. 3A schematically shows a cell 31 having picture elements arranged in a matrix which comprise scanning lines (scanning electrodes) 32, data lines (signal electrodes) 33 and a bistable optical modulation material interposed therebetween. For the brevity of explanation, a case where two state signals of "white" and "black" are displayed is explained. It is assumed that hatched picture elements correspond to "black" and the other picture elements correspond to "white" in FIG. 3A. First, in order to make a picture uniformly "white" (this step is called an "erasure step"), the bistable optical modulation material may be uniformly oriented to the first stable state. This can be effected by applying a predetermined voltage pulse signal (e.g., voltage: $+2V_0$, time width: Δt) to all the scanning lines and applying a predetermined pulse signal (e.g., $-V_0$, Δt) to all the data lines. In the erasure step, an electric signal of polarity opposite to that of a scanning selection signal in the writing step described hereinbelow is applied to the scanning lines, and an electric signal of a polarity opposite to that of an information selection signal (writing signal) in the writing step is applied to the data line, in phase with each other.

Figure 3B:
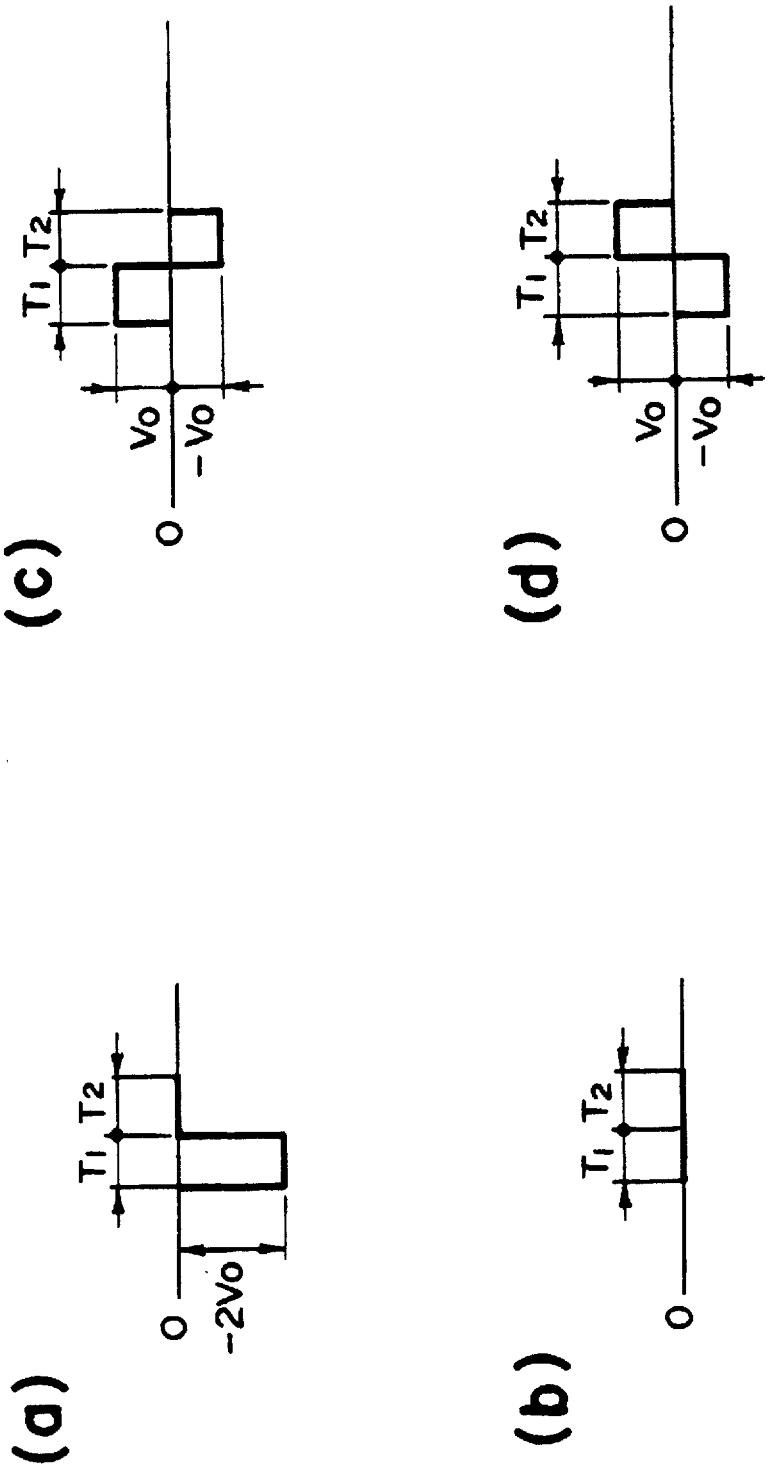

FIG. 3B(*a*) and 3B(*b*) show an electric signal (scanning selection signal) applied to a selected scanning line and an electric signal (scanning non-selection signal) applied to the other scanning lines (non-selected scanning lines), respectively. FIGS. 3B(*c*) and 3B(*d*) show an electric signal (information selection signal; $V_0$ applied at phase $T_1$) applied to a selected (referred to as "black") data line and an electric signal (information non-selection signal; $-V_0$ at phase $T_1$) applied to a non-selected (referred to as "white") data line, respectively. In the FIGS. 3B(*a*)–3B(*d*), the abscissa represents time, and the ordinate a voltage, respectively. $T_1$ and $T_2$ in the figures represent a phase for applying an information signal (and a scanning signal) and a phase for applying an auxiliary signal. This example shows a case where $T_1=T_2=\Delta t$.

The scanning lines 32 are selected sequentially. It is assumed herein that a threshold voltage for providing the first stable state (white) of the bistable liquid crystal at an application time of Δt be $-V_{th2}$, and a threshold voltage for providing the second stable state at an application time of Δt be $V_{th1}$. Then, the electric signal applied to the selected scanning line comprises voltages of $-2V_0$ at phase (time) $T_1$ and 0 at phase (time) $T_2$ as shown in FIG. 3B(*a*). The other scanning lines are placed in grounded condition as shown in FIG. 3B(*b*) and the electric signal is 0. On the other hand, the electric signal applied to the selected data line comprises $V_0$ at phase $T_1$ and $-V_0$ at phase $T_2$ as shown in FIG. 3B(*c*), and the electric signal applied to the non-selected data line comprises $-V_0$ at phase $T_1$ and $+V_0$ at phase $T_2$ as shown in FIG. 3B(*d*). In this instance, the voltage $V_0$ is set to a desired value which satisfies $V_0<V_{th1}<3V_0$ and $-V_0>-V_{th2}>-3V_0$.

Figure 3C:
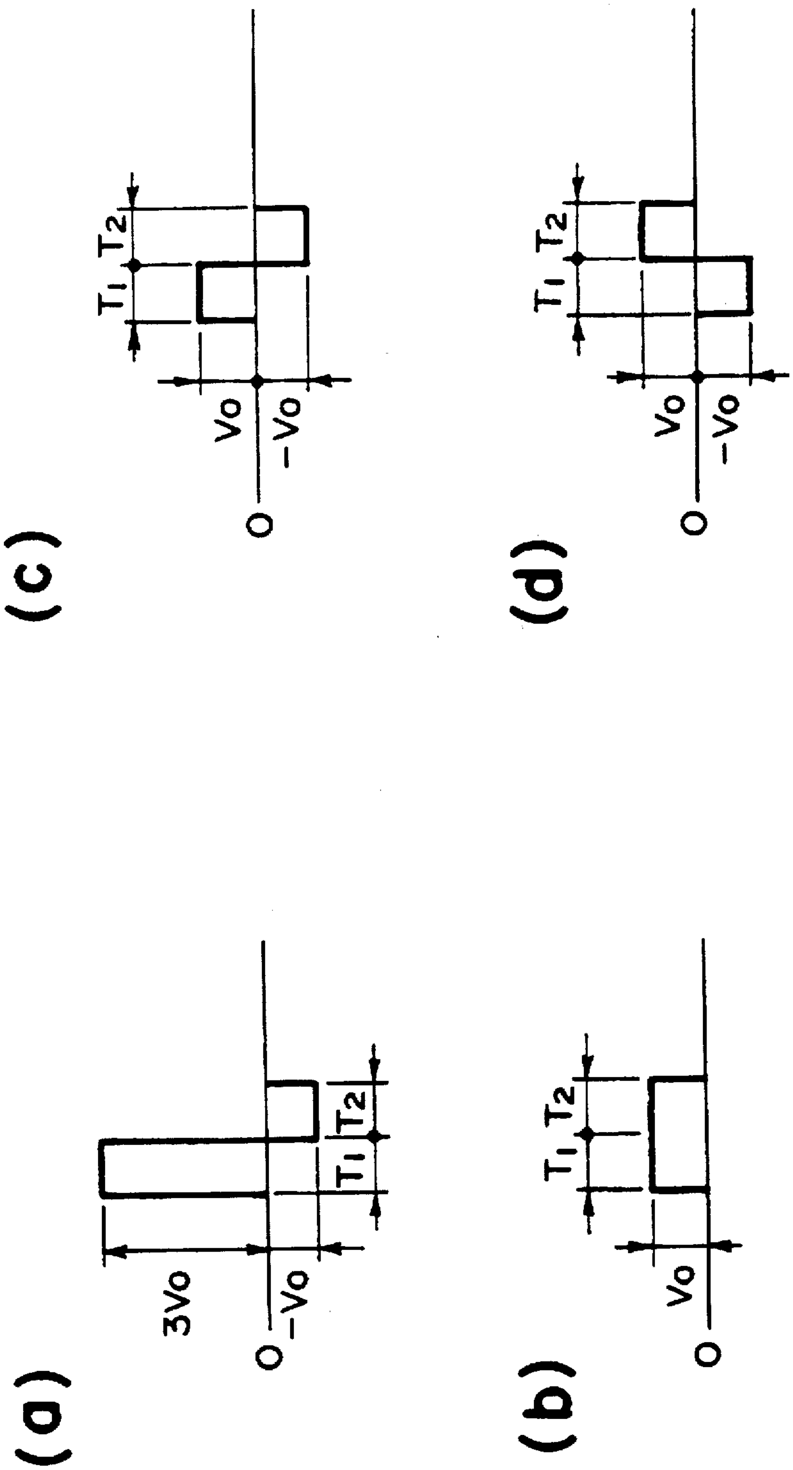

Voltage waveforms applied to respective picture elements when the above-mentioned electric signals are given are shown in FIGS. 3C. FIGS. 3C(*a*) and 3C(*b*) show voltage waveforms applied to picture elements where "black" and "white" are displayed, respectively, on the selected scanning line. FIGS. 3C(*c*) and 3C(*d*) respectively show voltage waveforms applied to picture elements on the non-selected scanning lines.

At phase $T_1$, on the scanning line to which a scanning selection signal $-2V_0$ is applied, an information signal $+V_0$ is applied to a picture element where "black" is to be displayed and, therefore, a voltage $3V_0$ exceeding the threshold voltage $V_{th1}$ is applied to the picture element, where the bistable liquid crystal is oriented to the second optically stable state. Thus, the picture element is written in "black" (writing step). On the same scanning line, the voltage applied to picture elements where "white" is to be displayed is a voltage $V_0$ which does not exceed the threshold voltage $V_{th1}$, and accordingly the picture element remains in the first optically stable state, thus displaying "white".

On the other hand, on the non-selected scannina lines, the voltage applied to all the picture elements is ±V or 0, each not exceeding the threshold voltage. Accordingly, the liquid crystal at the respective picture elements retains its orientation which has been obtained when the picture elements have been last scanned. In other words, after the whole picture elements have been oriented to one optically stable state ("white"), when one scanning line is selected, signals are written in one line of picture elements at the first phase $T_1$ and the written signal or display states are retained even after steps for writing one frame is finished.

Figure 4:
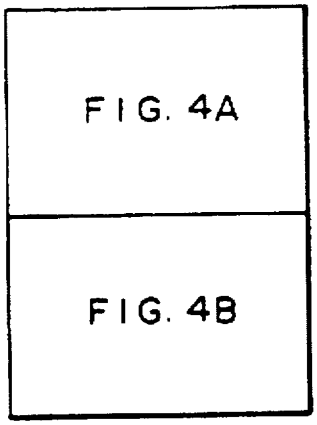
Figure 4A:
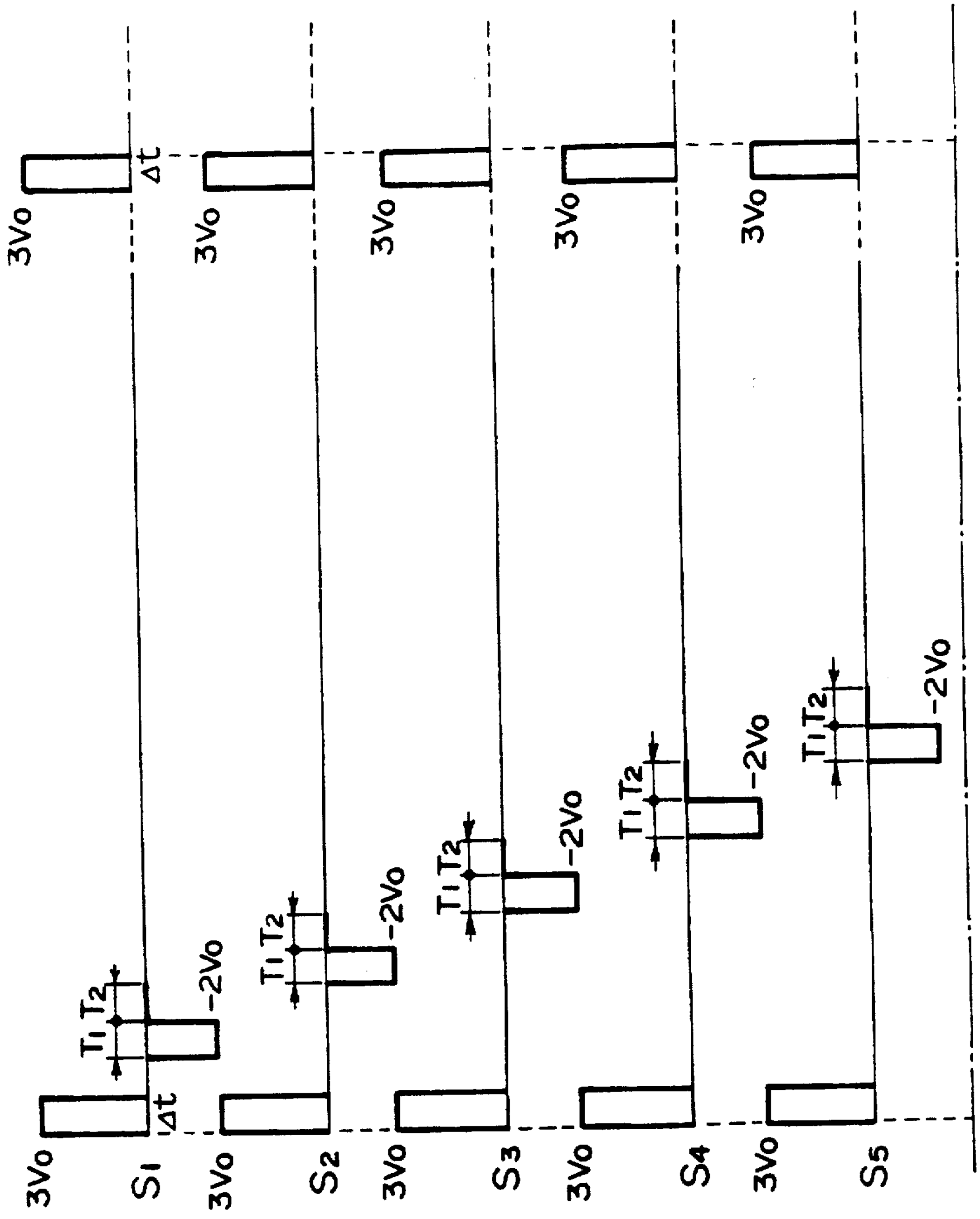
Figure 4B:
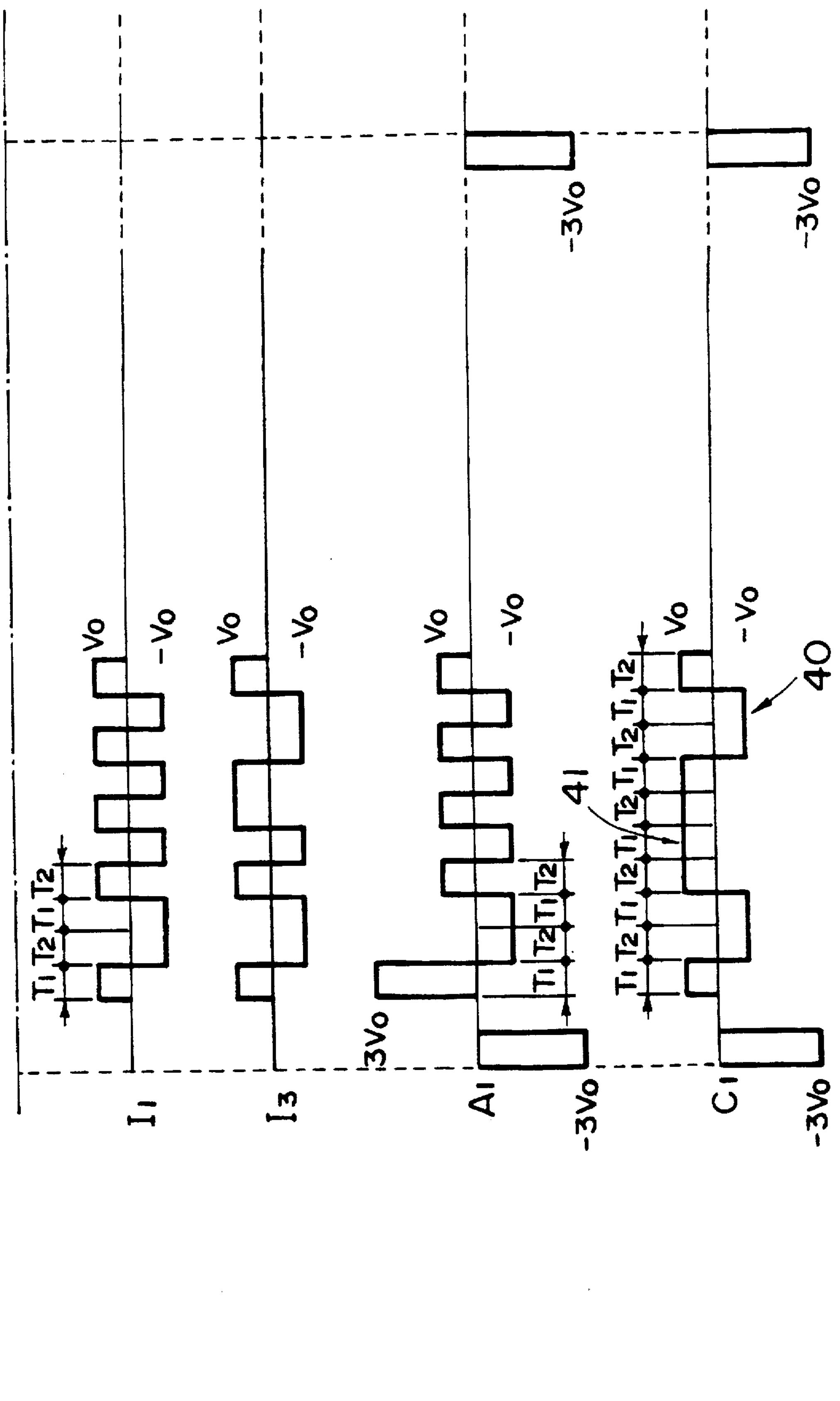

FIG. 4(combination of FIGS. 4A and 4B) shows an example of the above-mentioned driving signals in time series. $S_1$ to $S_5$ represent electric signals applied to scanning lines; $I_1$ and $I_3$ represent electric signals applied to data lines; and $A_1$ and $C_1$ represent voltage waveforms applied to picture elements $A_1$ and $C_1$, respectively, shown in FIG. 3A.

Microscopic mechanism of switching due to electric field of a ferroelectric liquid crystal having bistability has not been fully clarified. Generally speaking, however, the ferroelectric liquid crystal can retain its stable state semi-permanently, if it has been switched or oriented to the stable state by application of a strong electric field for a predetermined time and is left standing under absolutely no electric field. However, when a reverse polarity of an electric field is applied to the liquid crystal for a long period of time, even if the electric field is such a weak field (corresponding to a voltage below $V_{th}$ in the previous example) that the stable state of the liquid crystal is not switched in a predetermined time for writing, the liquid crystal can change its stable state to the other one, whereby correct display or modulation of information cannot be accomplished. We have recognized that the liability of such switching or reversal of oriented states under a long term application of a weak electric field is affected by a material and roughness of a base plate contacting the liquid crystal and the kind of the liquid crystal, but have not clarified the effects quantitatively. We have confirmed a tendency that a monoaxial treatment of the base plate such as rubbing or oblique or tilt vapor deposition of SiO, etc., increases the liability of the above-mentioned reversal of oriented states. The tendency is manifested at a hiaher temperature compared to a lower temperature.

Anyway, in order to accomplish correct display or modulation of information, it is advisable that one direction of electric field is prevented from being applied to the liquid crystal for a long time.

The phase $T_2$ in the driving method according to the present invention is a phase for obviating a situation where a unidirectional weak electric field is continuously applied. As a preferred embodiment for this purpose, as shown in FIGS. 3B(*c*) and 3B(*d*), a signal with a polarity opposite to that of the information signal (FIG. 3B(*c*) corresponds to "black", FIG. 3B(*d*) to "white") applied at phase $T_1$ is applied to the data line at phase $T_2$. In a case where a pattern shown in FIG. 3A is intended to be displayed, for example, by a driving method not having such phase $T_2$, picture element A is made "black" on scanning of the scanning electrode $S_1$, but it is highly possible that the picture element A will be switched sometime to "white" because an electric signal or voltage of $-V_0$ is continuously applied to the signal electrode $I_1$ during the steps for scanning of the scanning electrode $S_2$ and so on and the voltage is continuously applied to the picture element A as it is.

The whole picture is once uniformly rendered "white", and then "black" is written into picture elements corresponding to information at the first phase $T_1$. In this example, the voltage for writing "black" at phase $T_1$ is $3V_0$ and the application time is $\Delta t$. The voltage applied to the respective picture elements except at the scanning time is $|\pm V_0|$ to the maximum, and the longest time during which the maximum voltage is $2\Delta t$ as shown at part 40 in FIG. 4B. The severest condition is imposed when the information signals succeed in the order of white + white + black and the second "white" signal is applied at the scanning time. Even then, the application time is $4\Delta t$ which is rather short and does not cause crosstalk at all, whereby a displayed information is retained semipermanently after the scanning of the whole picture is once completed. For this reason, a refreshing step as required in a display device using a TN liquid crystal having no bistability is not required at all.

The optimum length of the second phase $T_2$ depends on the magnitude of the voltage applied to the data line. When a voltage having a polarity opposite to that of the information signal is applied, it is preferred that the time length is shorter for a larger voltage and longer for a shorter voltage. When the time is longer, it follows that a longer time is required for scanning the whole picture. Therefore, $T_2$ is preferably set to satisfy $T_2 \leqq T_1$.

Figure 6:
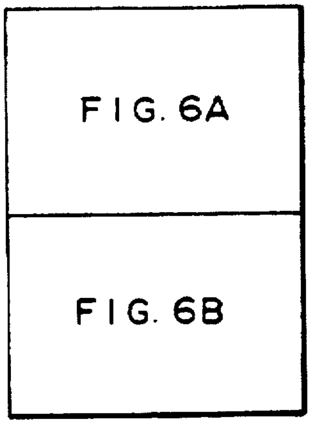
Figure 5A:
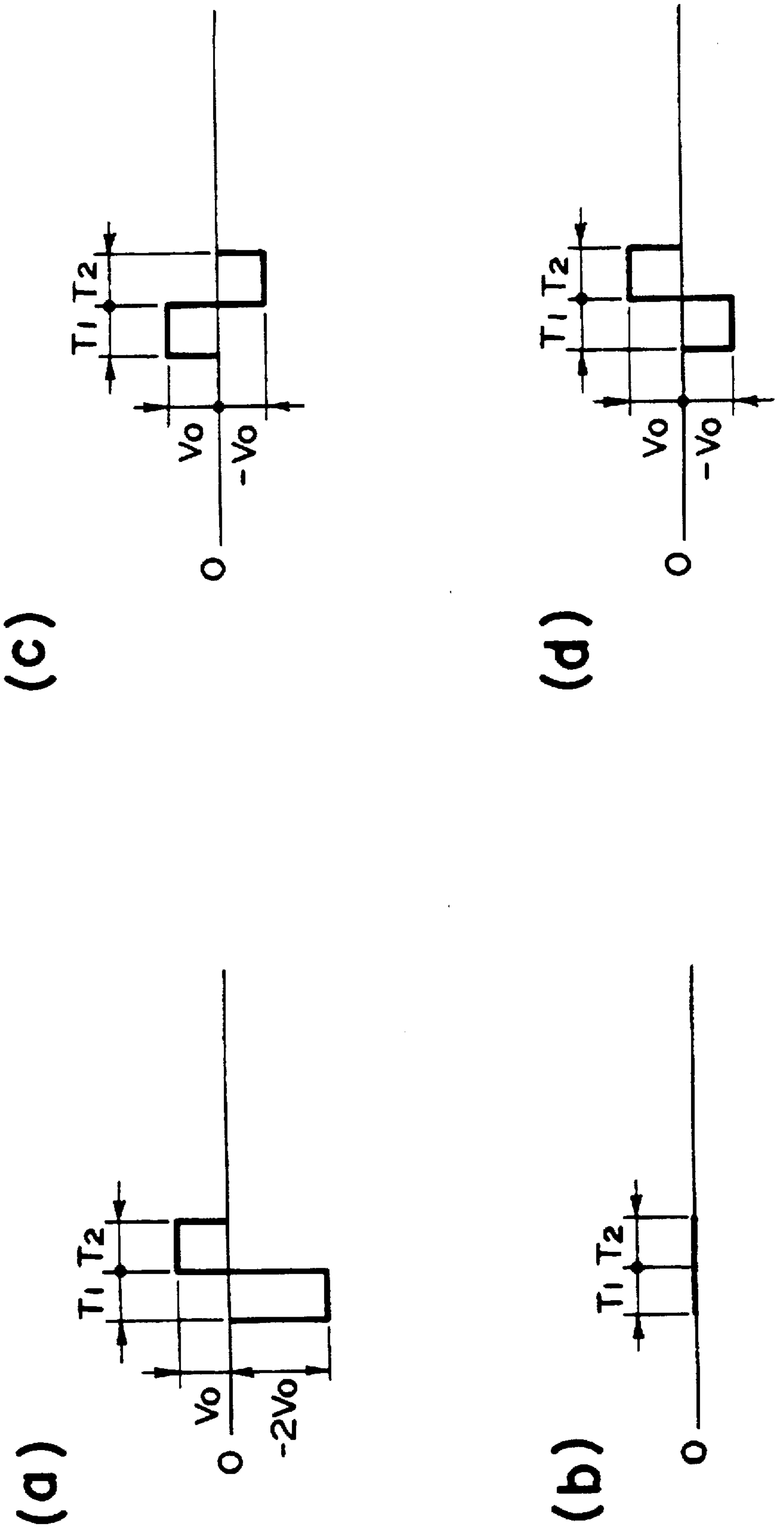
Figure 5B:
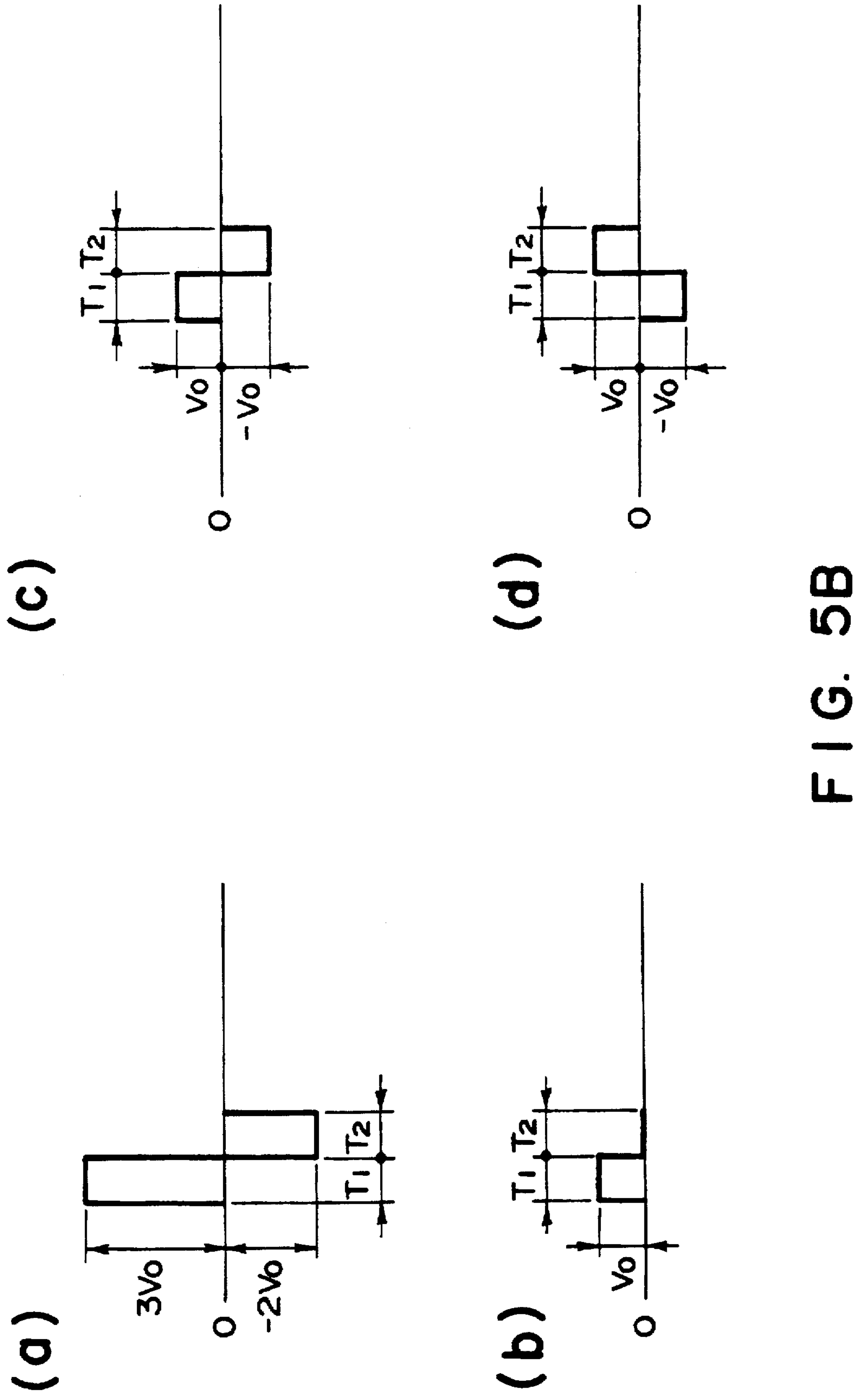
Figure 6A:
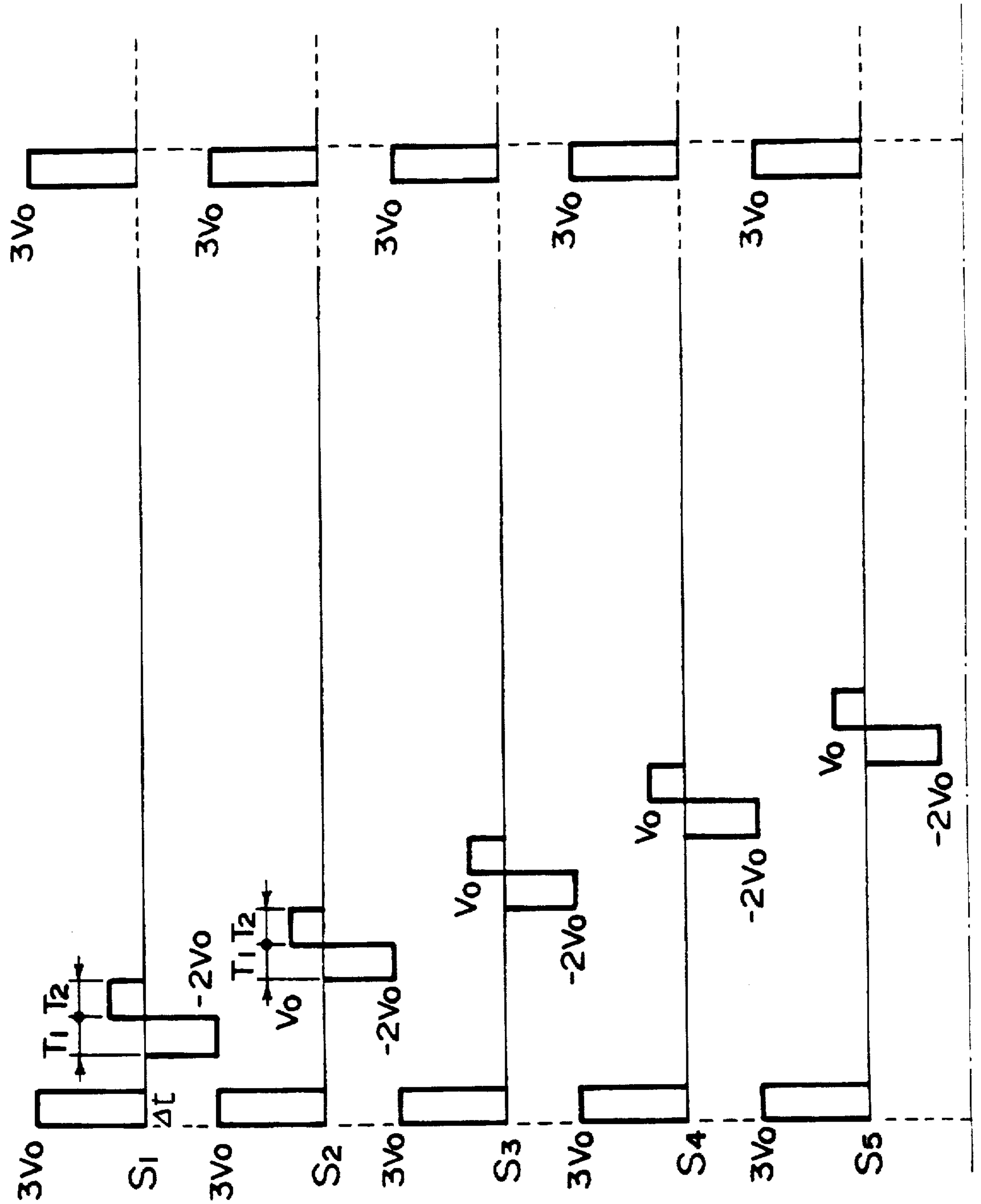
Figure 6B:
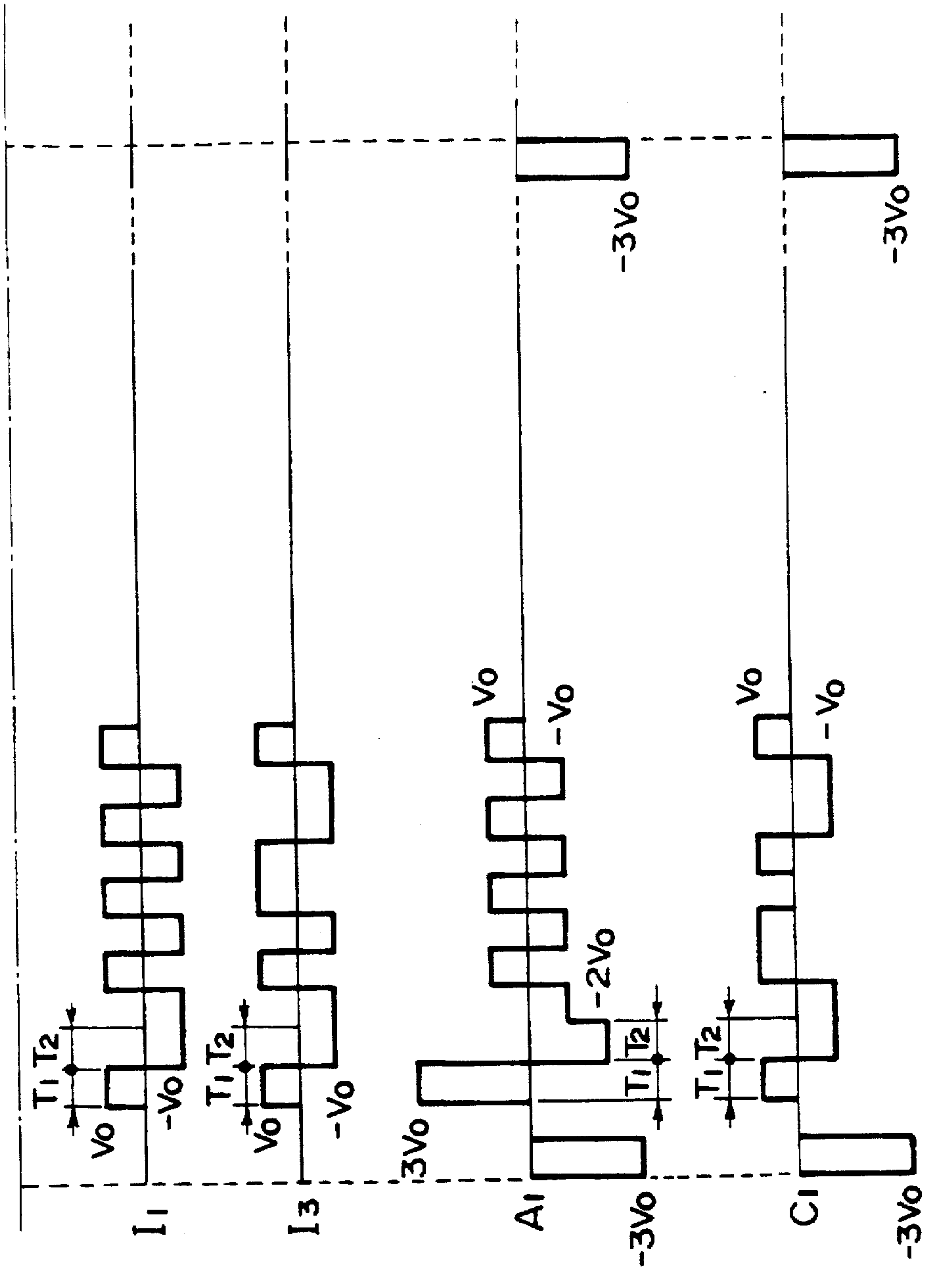

FIGS. 5 and 6 show another driving mode according to the present invention, FIGS. 5B(*a*) and 5B(*b*) show voltages applied to picture elements corresponding to "black" and "white", respectively, on a selected scanning line. FIGS. 5B(*c*) and 5B(*d*) show voltages applied to picture elements on a non-selected scanning line and on a data line to which "black" or "white" information signals are applied. FIG. 6 (combination of FIGS. 6A and 6B) illustrate these signals applied in time series.

Figure 7:
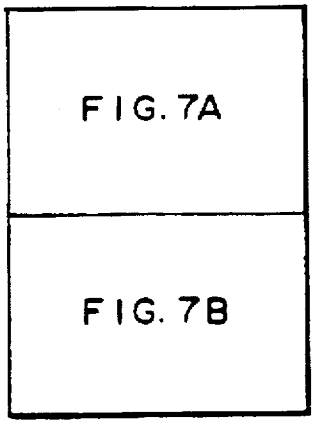
Figure 7A:
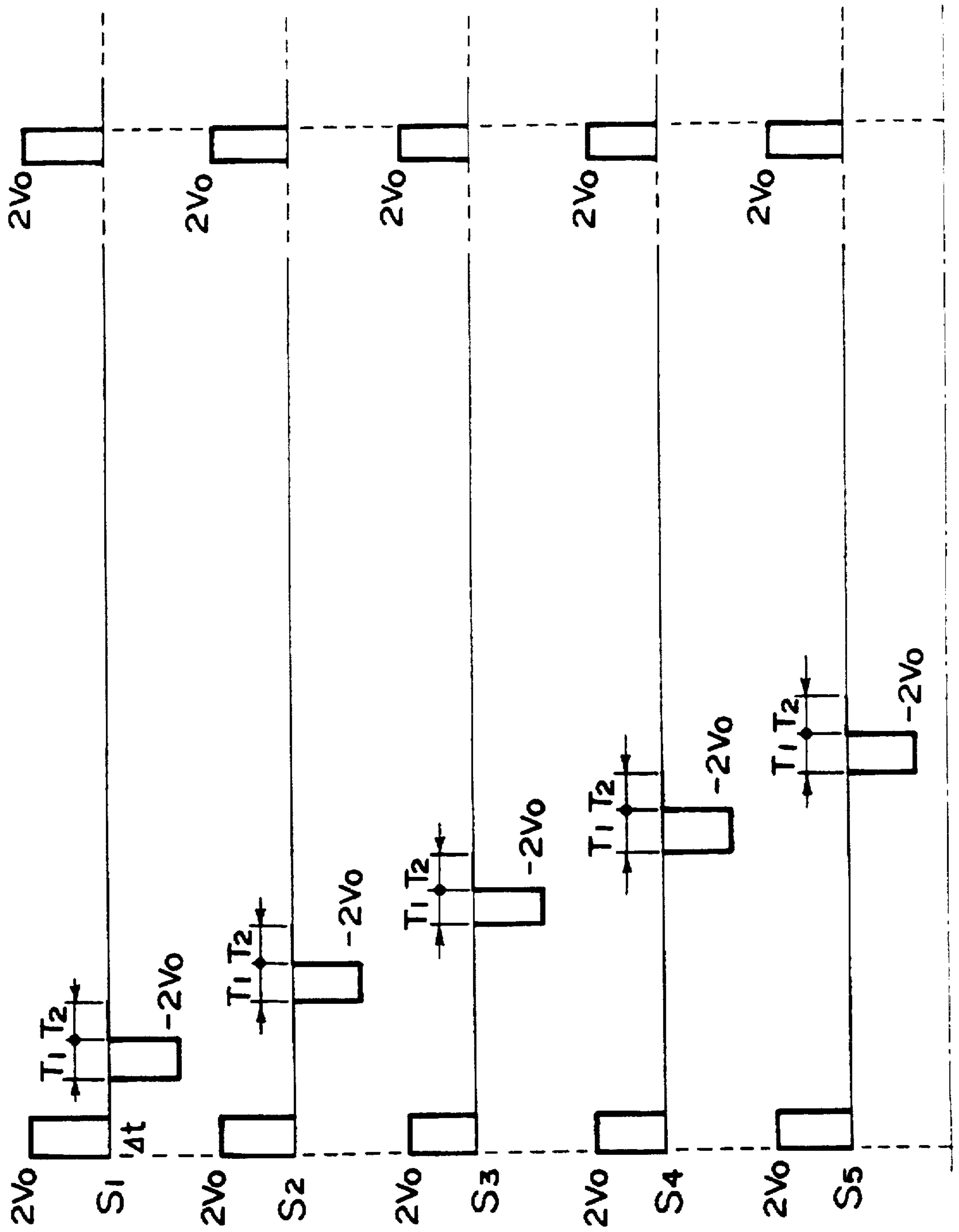
Figure 7B:
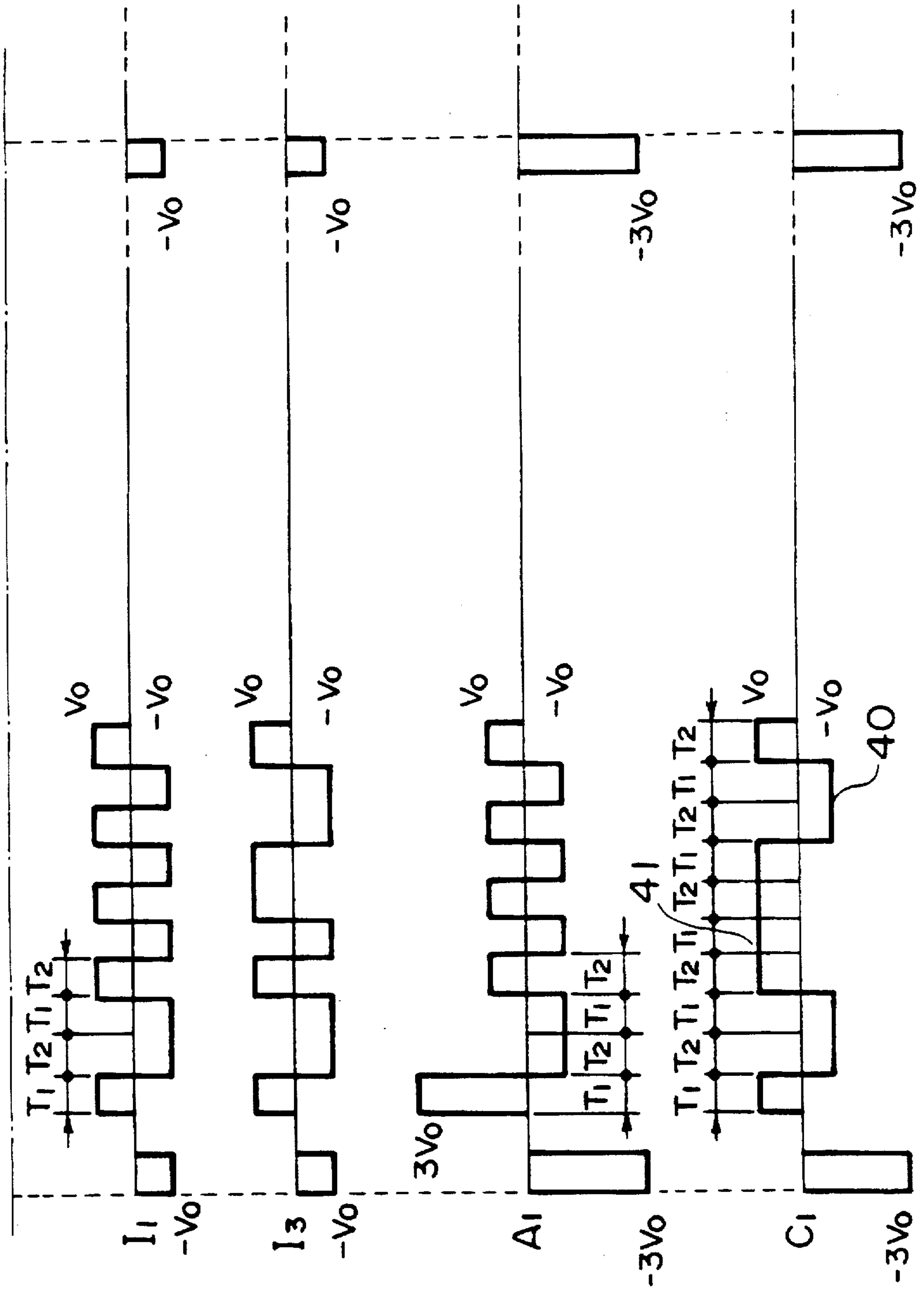

FIG. 7 (combination of FIGS. 7A and 7B) illustrates another embodiment of the erasure step than the one explained with reference to FIG. 4. Thus, in this example, the polarities of electric signals applied to scanning lines and data lines in the erasure step are made opposite to those of the scanning selection signals and information selection signals in the writing step. The voltage $V_0$ is also set to a value satisfying the relationships of $V_0 < V_{th1} < 3V_0$ and $-V_0 > -V_{th2} > -3V_0$.

In the embodiment shown in FIG. 7, in the erasure step $\Delta t$, an electric signal of $2V_0$ is applied to the scanning lines at a time and, in phase with the electric signal, a signal of $-V_0$ with a polarity oppoiste to that of the electric signal is applied to the data lines. In the next writing step, signals similar to writing signals explained with reference to FIGS. 3 and 4 are applied to the scanning lines and data lines.

Figure 8:
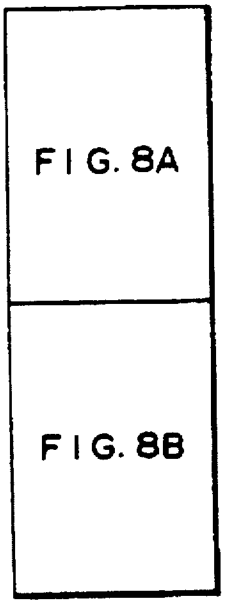
Figure 9:
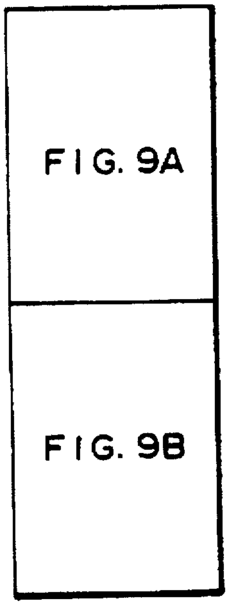
Figure 8A:
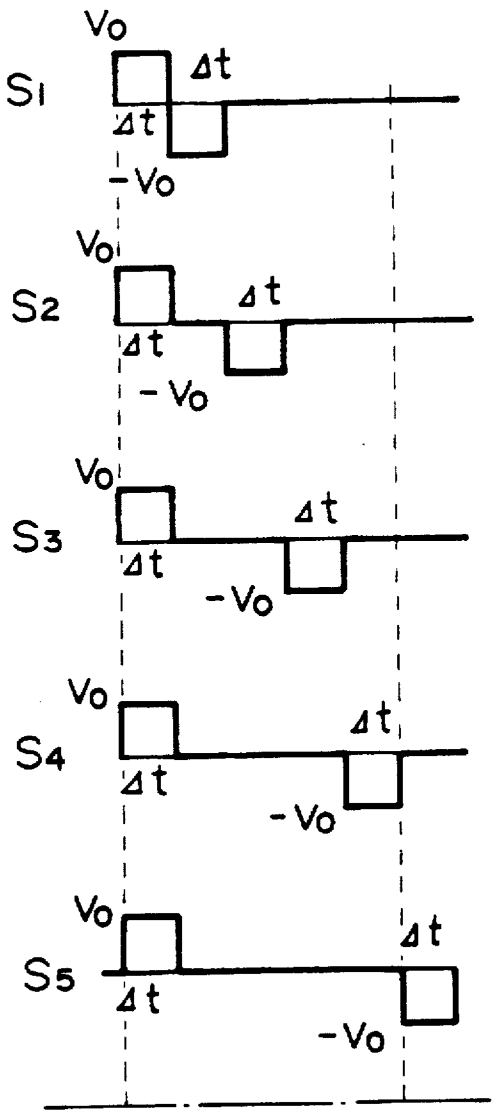
Figure 9A:
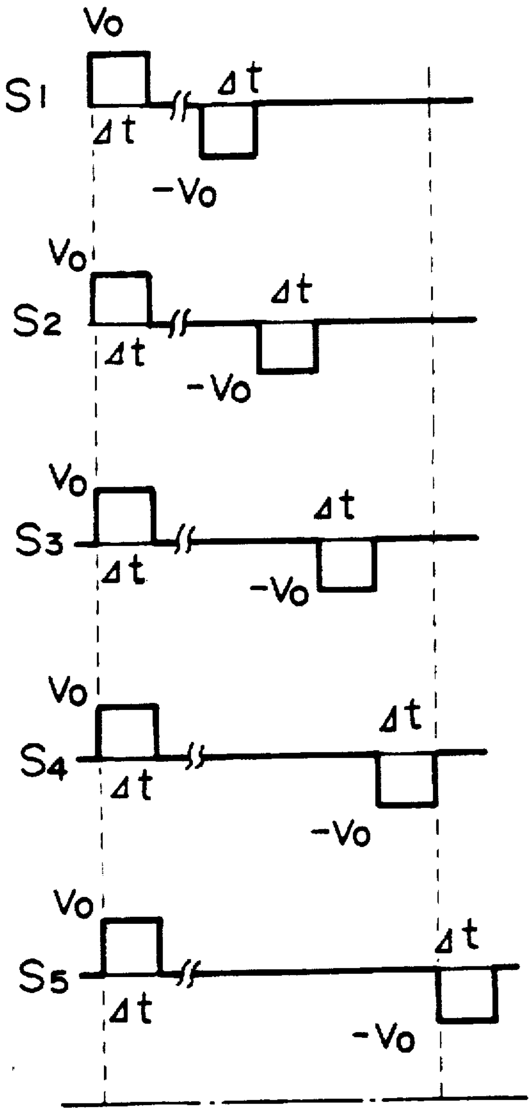
Figure 8B:
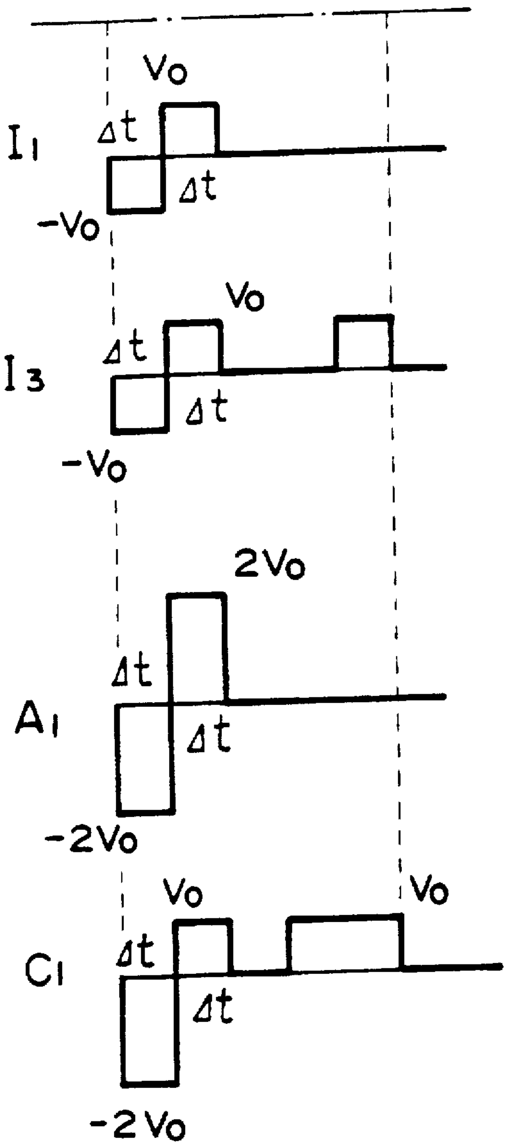
Figure 9B:
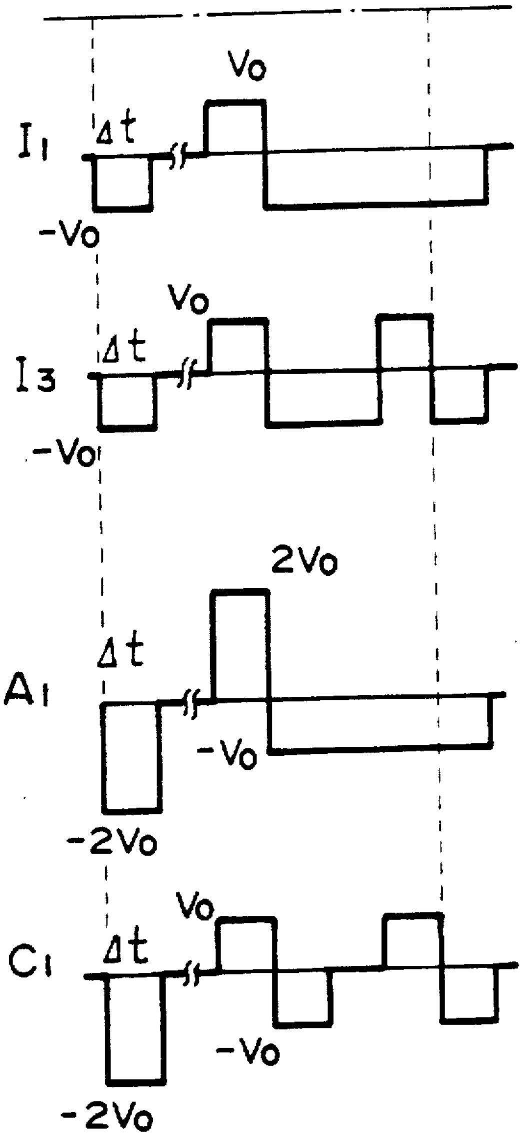

FIG. 8 (combination of FIGS. 8A and 8B) and FIG. 9 (combination of FIGS. 9A and 9B) respectively show examples of driving modes according to the present invention in time series. In these driving modes, a voltage value $V_0$ is so set that the threshold voltage for changing orientations for a pulse width $\Delta t$ is placed between $|V_0|$ and $2|V_0|$.

In FIG. 8 (FIGS. 8A and 8B), an electric signal of $+V_0$ is applied to the scanning lines and, in phase therewith, an electric signal of $-V_0$ is applied to the data lines for erasing a picture. Immediately thereafter and subsequently, in the writing step, scanning signals of $S_1$, $S_2$, . . . , each of $-V_0$, are sequentially applied and, in phase with these scanning signals, information signals, each of $+V_0$, are applied to data lines, whereby writing is carried out.

Figure 10:
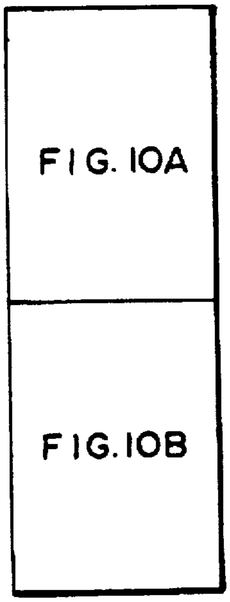
Figure 10A:
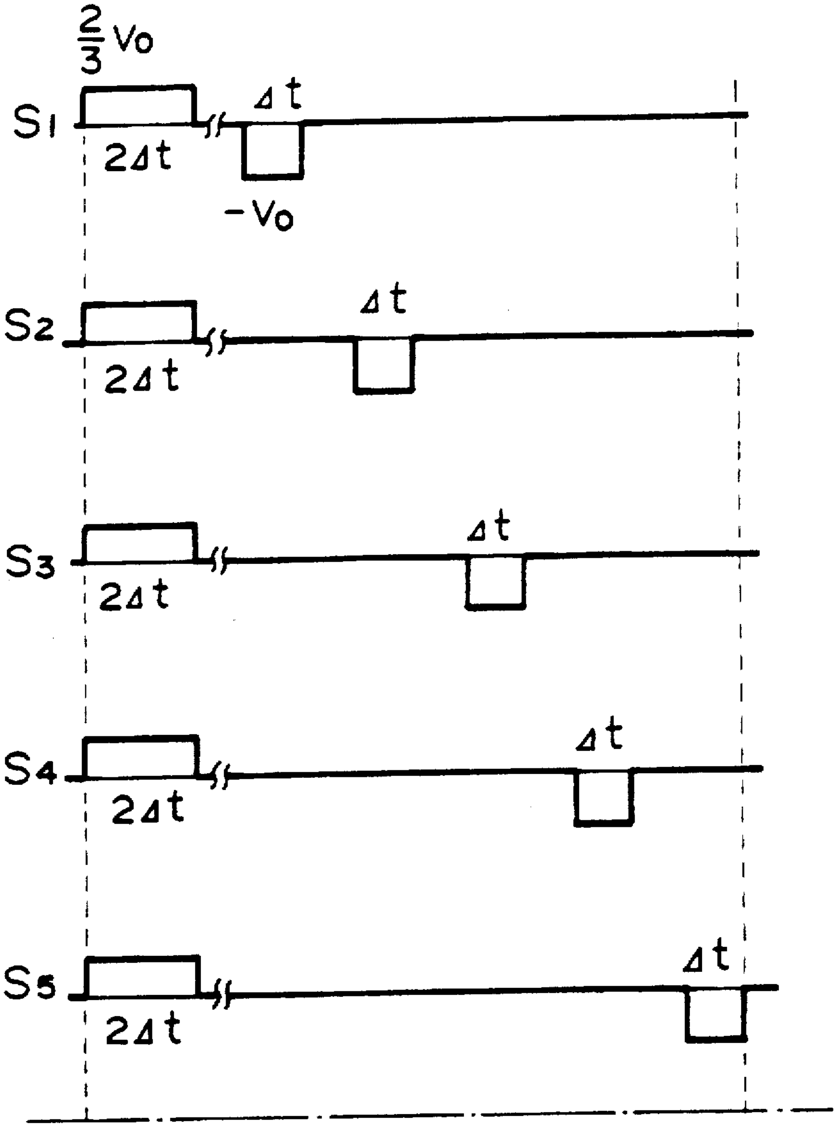
Figure 10B:
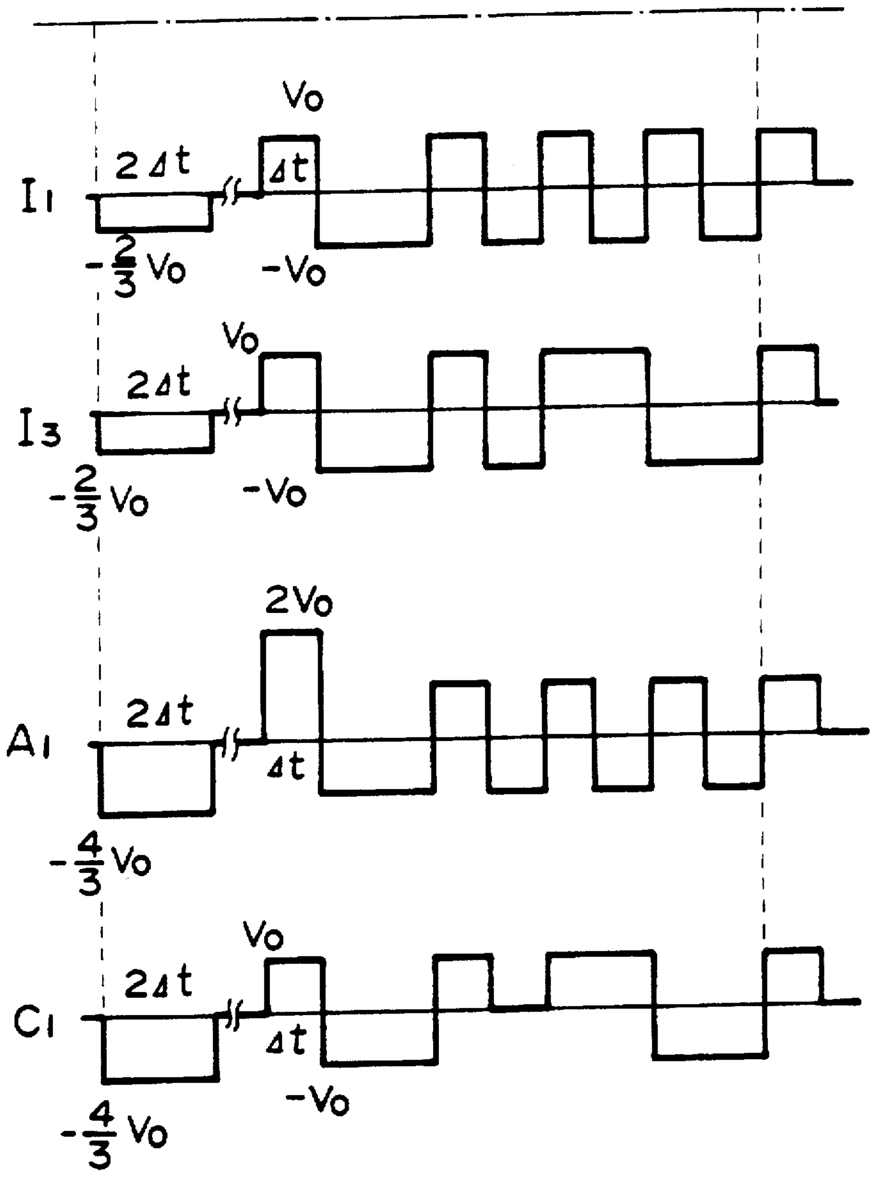

FIGS. 8 and 9 respectively show examples where no auxiliary signal is involved, whereas FIG. 10 (combination of FIGS. 10A and 10B) shows an example where an auxiliary signal is used. Voltage values in respective driving pulses are shown in the figure. In the example of FIG. 10, electric signals applied to scanning lines and data lines in the erasure step have polarities respectively opposite to those applied in the writing step, have magnitudes in terms of absolute values smaller ($\frac{2}{3}$ $V_0$)than those of the latter and have larger pulse widths (2Δt) than those of the latter. This erasure mode is effective in a case where the threshold voltage depends on pulse widths and a threshold voltage $V_{th}^{2\Delta t}$ for a width of 2Δt satisfies a relationship of $V_{th}^{2\Delta t} \leqq \frac{4}{3} V_0$.

Figure 11A:
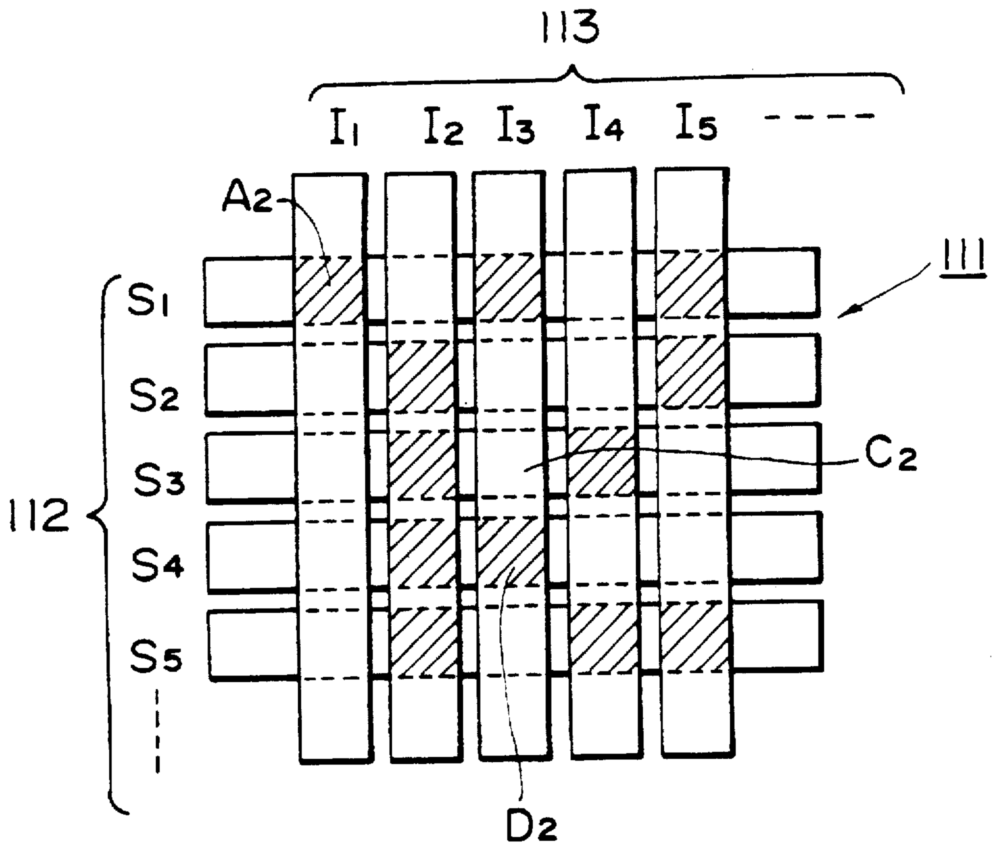
FIGS. 11A and 11D are plan views respectively showing an electrode arrangement used in a different embodiment of the driving method according to the present invention, FIGS. 11B(*a*)–(*d*) illustrate waveforms of electric signals applied to electrodes, FIGS. 11C(*a*)–(*d*) illustrate voltage waveforms applied to picture elements, FIGS. 12A to 15A in combination with FIGS. 12B to 15B, respectively, illustrate still different examples of voltage waveforms applied in time series.
Figure 11B:
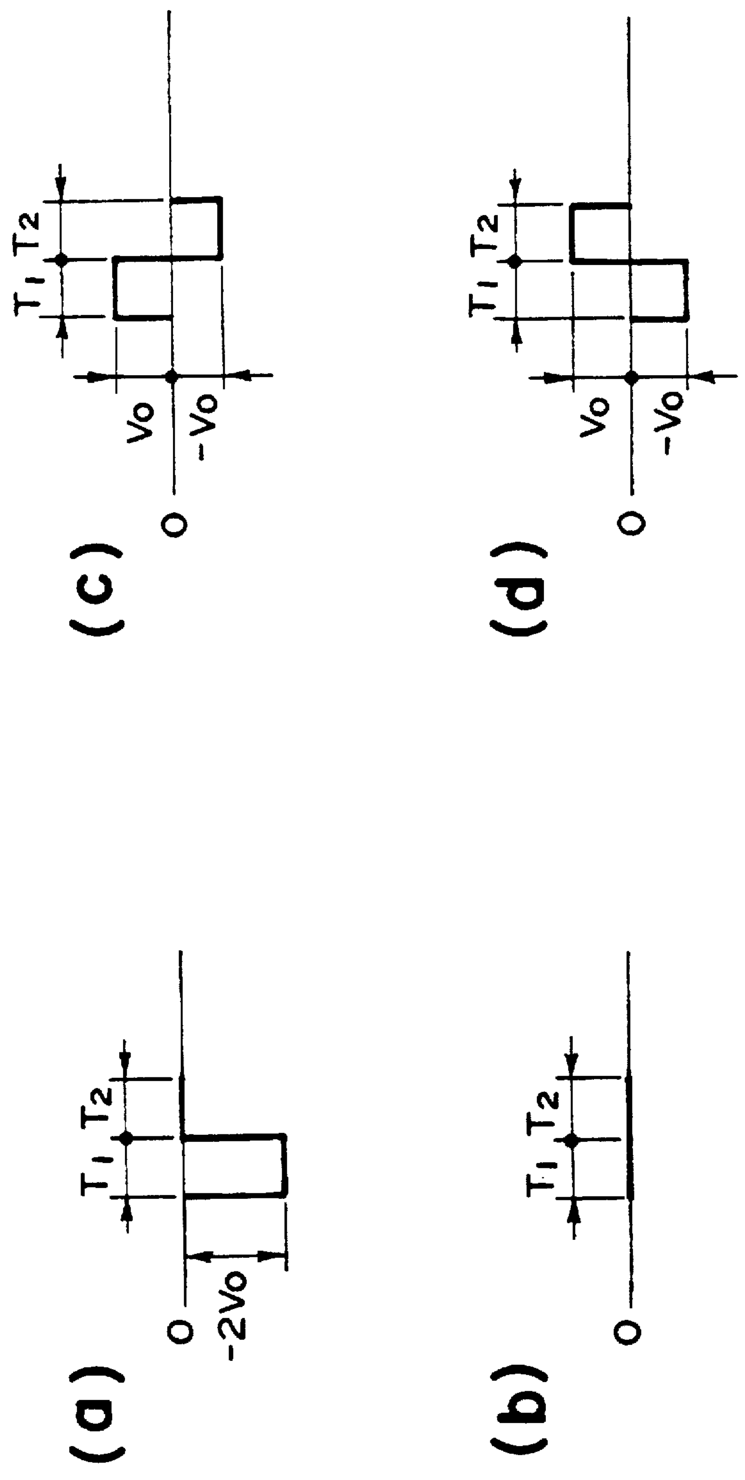
Figure 11C:
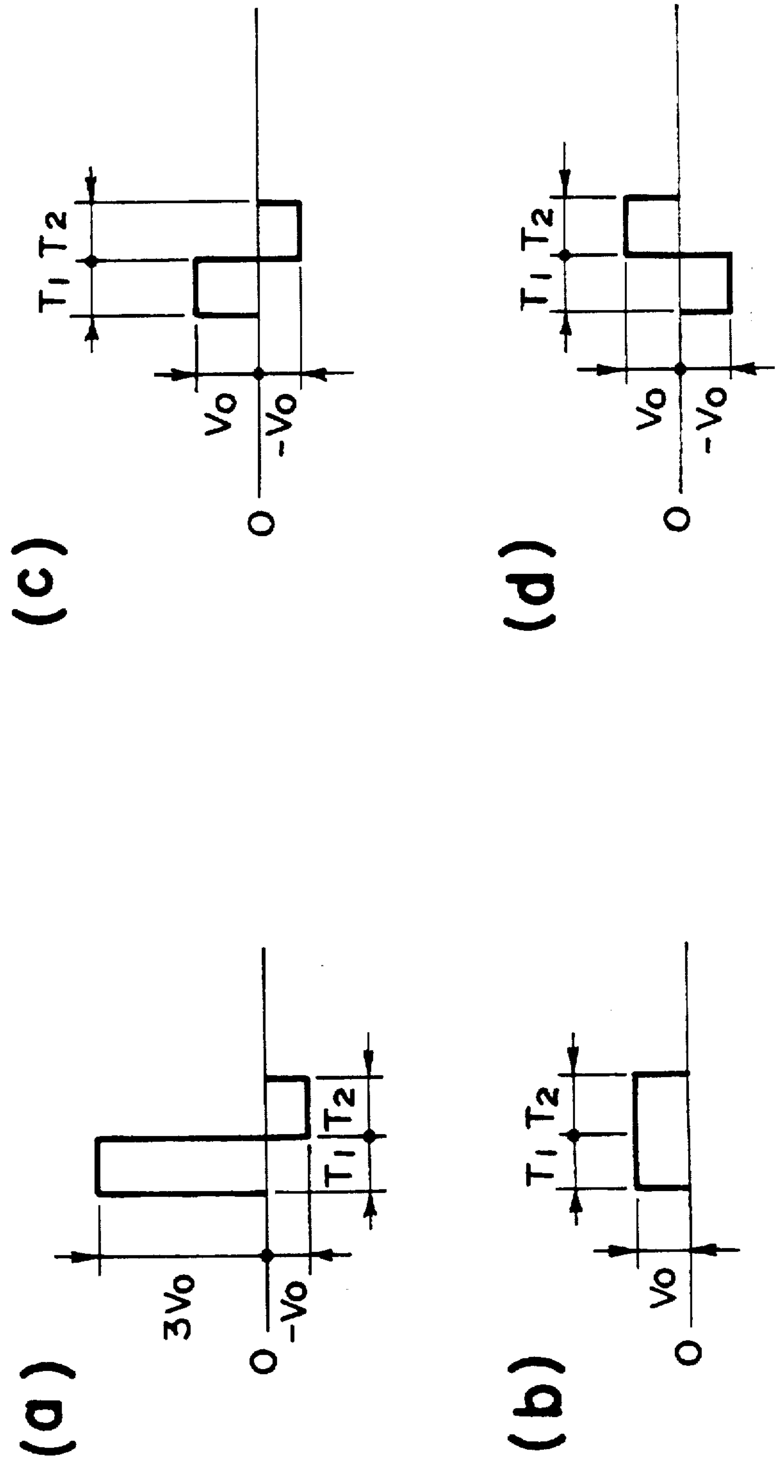
Figure 11D:
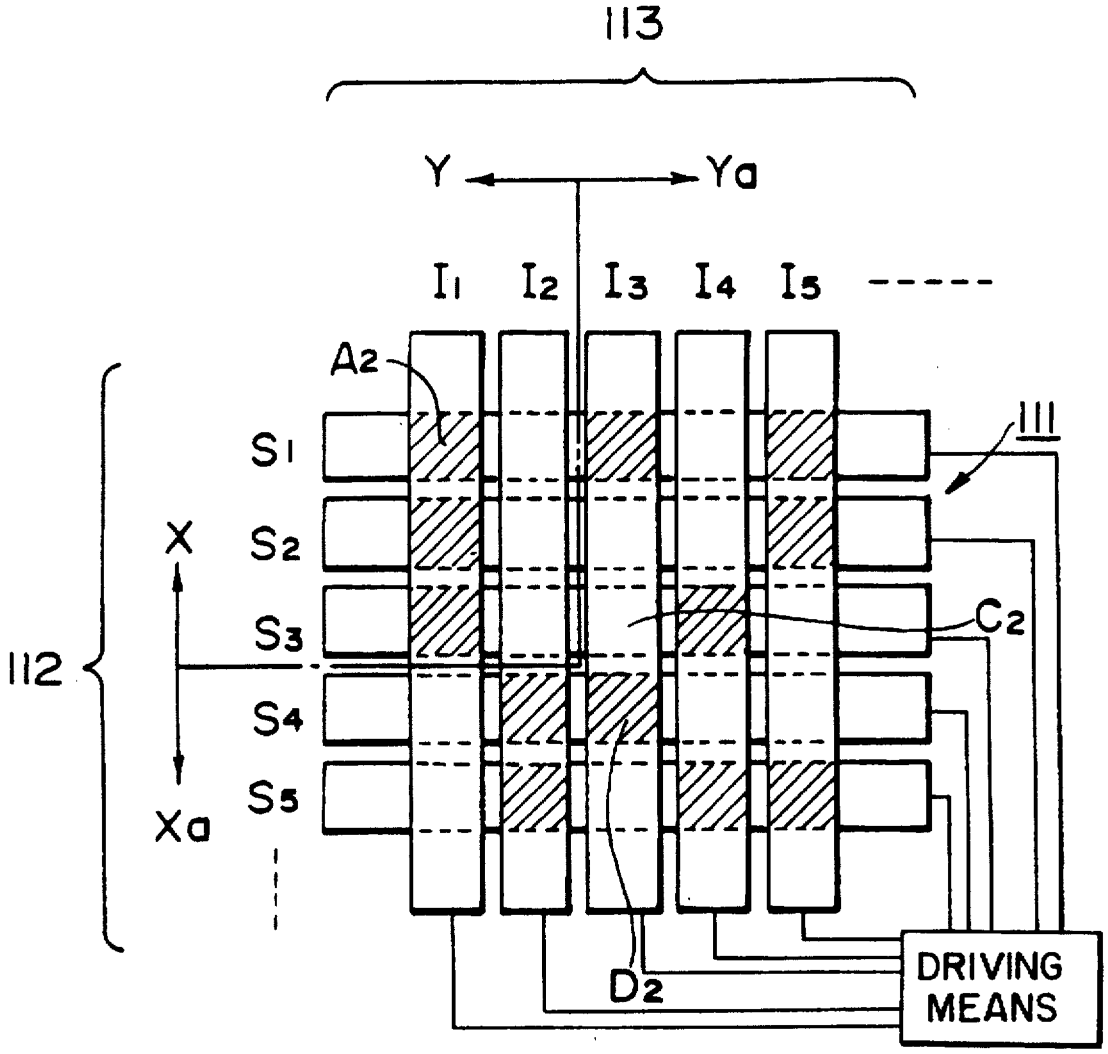
Figure 12:
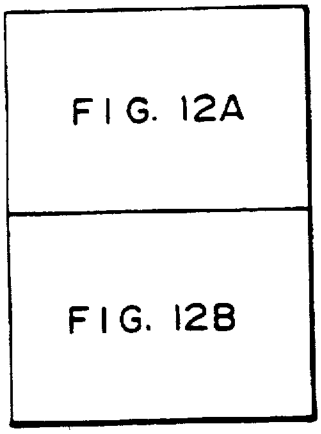

FIG. 11 (inclusive of FIGS. 11A, 11B and 11C) and FIG. 12 (combination of FIGS. 12A and 12B) illustrate a driving mode for an optical modulation device comprising:

- a partial erasure step wherein electric signals are applied to selected scanning lines among the scanning lines and selected data lines; the selected scanning lines and selected data lines constituting a new image area where a new image is to be written, and the electric signals applied to the selected scanning lines and selected data lines having polarities opposite to those of a scanning selection signal and an information selection signal applied to the respective lines for writing images; whereby the optical modulation material constituting the new image area is oriented to the first stable state and an image written in a previous writing step is partially erased; and
- a partial writing step wherein a scanning selection signal is applied to the selected scanning lines and an information signal for orienting the optical modulation material to the second stable step is applied to the selected data lines corresponding to information giving the new image.

A preferred embodiment of the above mentioned driving mode will be explained with reference to FIG. 11.

FIG. 11A schematically shows a cell 111 having picture elements arranged in a matrix which comprise scanning lines (scanning electrodes) 112, data lines (signal electrodes) 113 and a bistable optical modulation material interposed therebetween. For the brevity of explanation, a case where two state signals of "white" and "black" are displayed is explained. It is assumed that hatched picture elements correspond to "black" and the other picture elements correspond to "white" in FIG. 3A. First, in order to make a picture uniformly "white" (this step is called an "erasure step"), the bistable optical modulation material may be uniformly oriented to the first stable state. This can be effected by applying a predetermined voltage pulse signal (e.g., voltage: $+2V_0$, time width: Δt) to all the scanning lines and applying a predetermined pulse signal (e.g., $-V_0$, Δt) to all the data lines. In the erasure step, an electric signal of a polarity opposite to that of a scanning selection signal in the writing step described hereinbelow is applied to the scanning lines, and an electric signal of a polarity opposite to that of an information selection signal (writing signal) in the writing step is applied to the data line, in phase with each other.

FIG. 11B(*a*) and 11B(*b*) show an electric signal (scanning selection signal) applied to a selected scanning line and an electric signal (scanning nonselection signal) applied to the other scanning lines (nonselected scanning lines), respectively. FIGS. 11B(*c*) and 11B(*d*) show an electric signal (information selection signal; $V_0$ applied at phase $T_1$) applied to a selected (referred to as "black") data line and an electric signal (information non-selection signal; $-V_0$ at phase $T_1$) applied to a non-selected (referred to as "white") data line, respectively. In the FIG. 11B(*a*)–11B(*d*), the abscissa represents time, and the ordinate a voltage, respectively. $T_1$ and $T_2$ in the figures represent a phase for applying an information signal (and scanning signal) and a phase for applying an auxiliary signal. This example shows a case where $T_1=T_2=\Delta t$.

The scanning lines 112 are selected sequentially. It is assumed herein that a threshold voltage for providing the first stable state (white) of the bistable liquid crystal at an application time of Δt be $-V_{th2}$, and a threshold voltage for providing the second stable state at an application time of Δt be $-V_{th1}$. Then, the electric signal applied to the selected scanning line comprises voltages of $-2V_0$ at phase (time) $T_1$ and 0 at phase (time) $T_2$ as shown in FIG. 11B(*a*). The other scanning lines are placed in grownded condition as shown in FIG. 11B(*b*) and the electric signal is 0. On the other hand, the electric signal applied to the selected data line comprises $V_0$ at phase $T_1$ and $-V_0$ at phase $T_2$ as shown in FIG. 11B(*c*), and the electric signal applied to the nonselected data line comprises $-V_0$ at phase $T_1$ and $+V_0$ at phase $T_2$ as shown in FIG. 11B(*d*). In this instance, the voltage $V_0$ is set to a desired value which satisfies $V_0<V_{th1}<3V_0$ and $-V_0>-V_{th2}>-3V_0$.

Voltage waveforms applied to respective picture elements when the above mentioned electric signals are given are shown in FIGS. 11C. FIGS. 11C(*a*) and 11C(*b*) show voltage waveforms applied to picture elements where "black" and "white" are displayed, respectively, on the selected scanning line. FIGS. 11C(*c*) and 11C(*d*) respectively show voltage waveforms applied to picture elements on the nonselected scanning lines.

At phase $T_1$, on the scanning line to which a scanning selection signal $-2V_0$ is applied, an information signal $+V_0$ is applied to a picture element where "black" is to be displayed and, therefore, a voltage $3V_0$ exceeding the threshold voltage $V_{th1}$ is applied to the picture element, where the bistable liquid crystal is oriented to the second optically stable state. Thus, the picture element is written in "black" (writing step). On the same scanning line, the voltage applied to picture elements where "white" is to be displayed is a voltage $V_0$ which does not exceed the threshold voltage $V_{th1}$ and accordingly the picture element remains in the first optically stable state, thus displaying "white".

On the other hand, on the nonselected scanning lines, the voltage applied to all the picture elements is ±V or 0, each not exceeding the threshold voltage. Accordingly, the liquid crystal at the respective picture elements retains its orientation which has been obtained when the picture elements have been last scanned. In other words, after the whole picture elements have been oriented to one optically stable state ("white"), when one scanning line is selected, signals are written in one line of picture elements at the first phase $T_1$ and the written signal or display states are retained even after steps for writing one frame is finished.

FIG. 11A shows an example of a picture thus formed through the erasure step and the writing step. FIG. 11D shows an example of a picture obtained by partially rewriting the picture shown in FIG. 11A. This example shown in FIG. 11D illustrates a case where an X-Y region or area formed by scanning lines X and data lines Y is intended to be rewritten. For this purpose, an electric signal (e.g., $2V_0$ shown in FIG. 12) having a polarity opposite to that of a scanning selection signal (e.g., $-2V_0$ in FIG. 12) applied in the previous writing step is applied , by a writing or driving means, at a time or sequentially to scanning lines $S_1$, $S_2$ and $S_3$ corresponding to the new image region (X-Y region) to be rewritten. On the other hand, an electric signal (e.g., $-V_0$ on line $I_1$ in FIG. 12) having a polarity opposite to that of an information selection signal (e.g., $V_0$ on $I_1$ in FIG. 12) is applied by the writing or driving means, to data lines $I_1$ and $I_2$ corresponding to the new image region. Thus, only a part (e.g., X-Y region) of one picture can be erased (Partial Erasure Step).

The writing in the partially erased region (X-Y region) is then effected by applying the same procedure as in the writing step, i.e., by applying an information selection signal ($+V_0$) and an information non-selection signal ($-V_0$) corresponding to predetermined rewriting image information to the data lines for the partially erased region in phase with a scanning selection signal ($-2V_0$).

On the other hand, an electric signal below the threshold voltage of the ferroelectric liquid crystal is applied to the picture elements in the non-rewriting region (i.e., $X_a$-Y, $X_a$-$Y_a$ and X-$Y_a$ regions) so that the writing state of each picture element in the non-rewriting region is retained.

More specifically, in the partial erasure step, an electric signal (e.g., $V_0$ on $I_3$ in FIG. 12) having the same polarity as an electric signal (e.g., $2V_0$ in FIG. 12) applied to the scanning signal in the erasure step is applied to the data lines not constituting the rewriting region (X-Y region). Further, in the partial writing step, an electric signal (e.g., $-V_0$ on $I_3$ in FIG. 12) having the same polarity as a scanning selection signal (e.g., $-2V_0$ on $S_1$, $S_2$ and $S_3$ in FIG. 12) is applied to the data lines not constituting the rewriting region (X-Y region) in phase with the selection scanning signal. On the other hand, the potential of the scanning lines not constituting the rewriting region is held at a base potential (e.g., 0 volt).

Figure 12A:
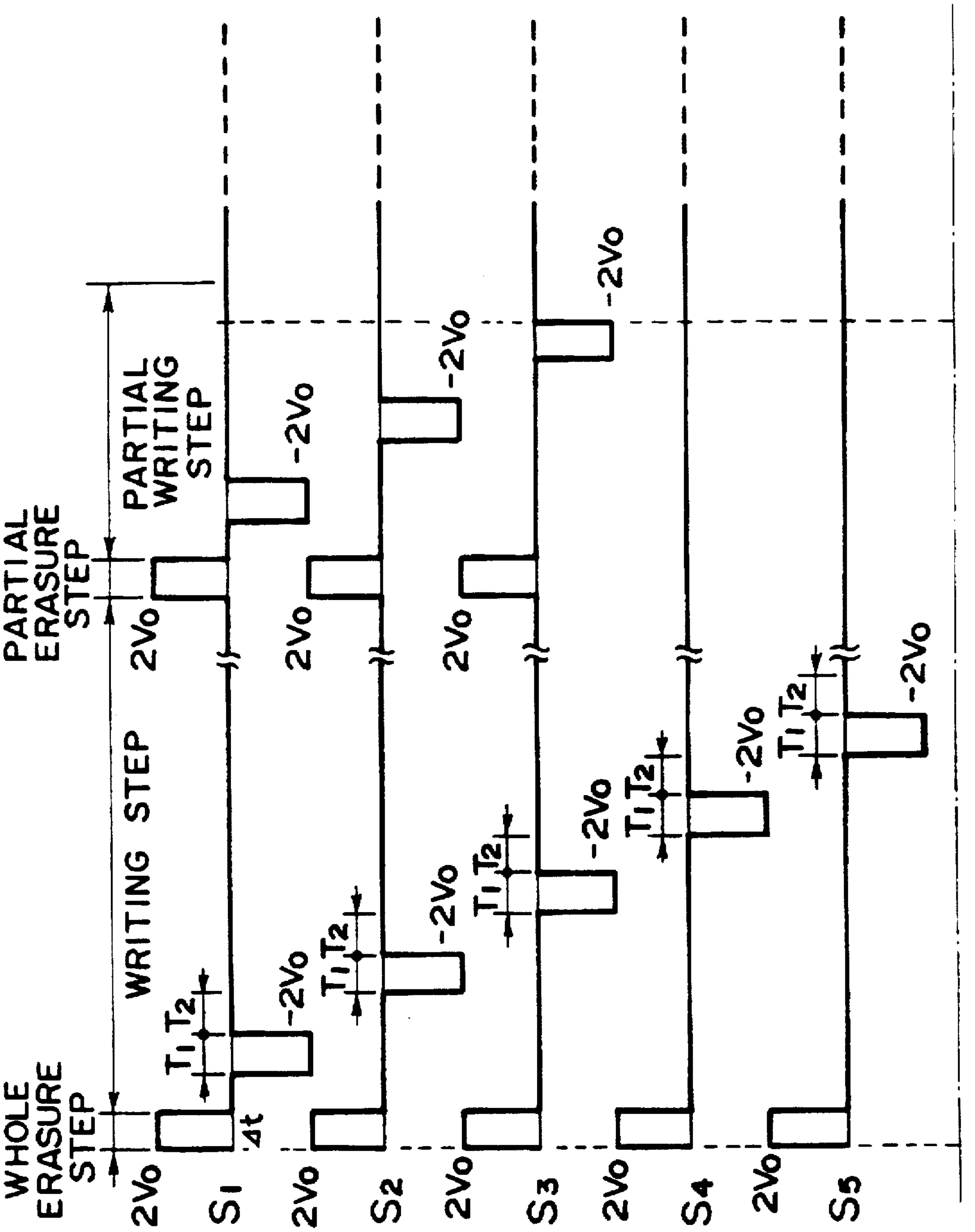
Figure 12B:
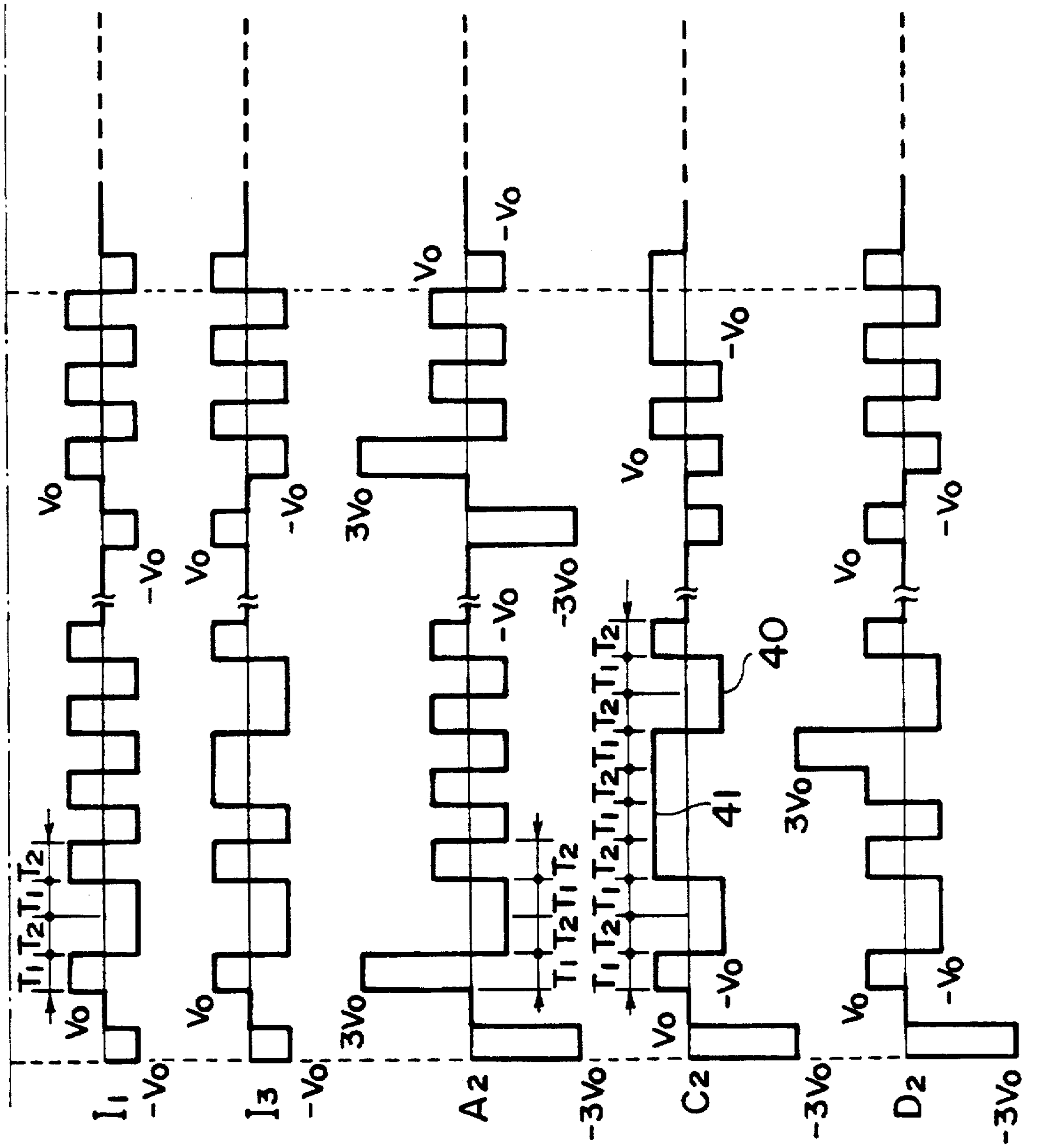

The above explained driving signals are shown in time series in FIG. 12 (combination of FIGS. 12A and 12B). $S_1$–$S_5$ indicate electric signals applied to scanning signals; $I_1$ and $I_3$ indicate electric signals applied to data lines; and $A_2$, $C_2$ and $D_2$ indicate waveforms applied to picture elements $A_2$, $C_2$ and $D_2$ shown in FIGS. 11A and 11D.

A rewriting region can be appointed by a cursor in the present invention.

Figure 13:
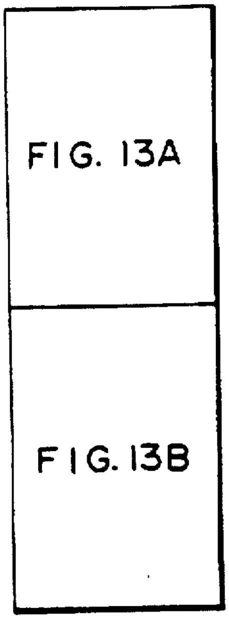
Figure 14:
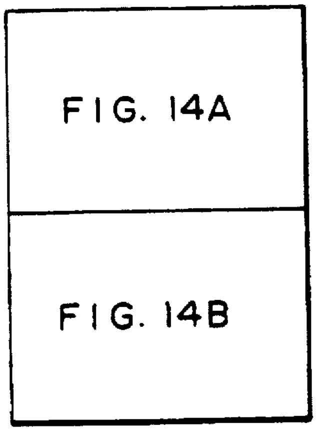
Figure 13A:
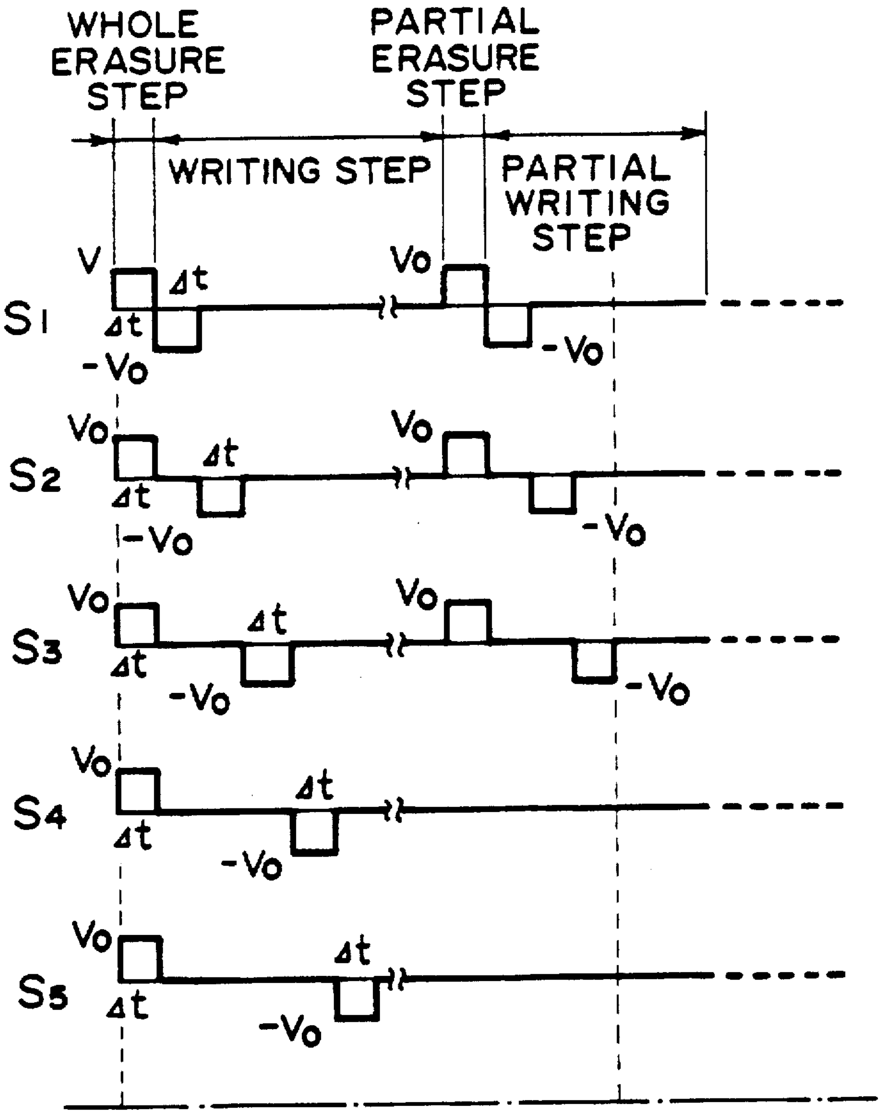
Figure 13B:
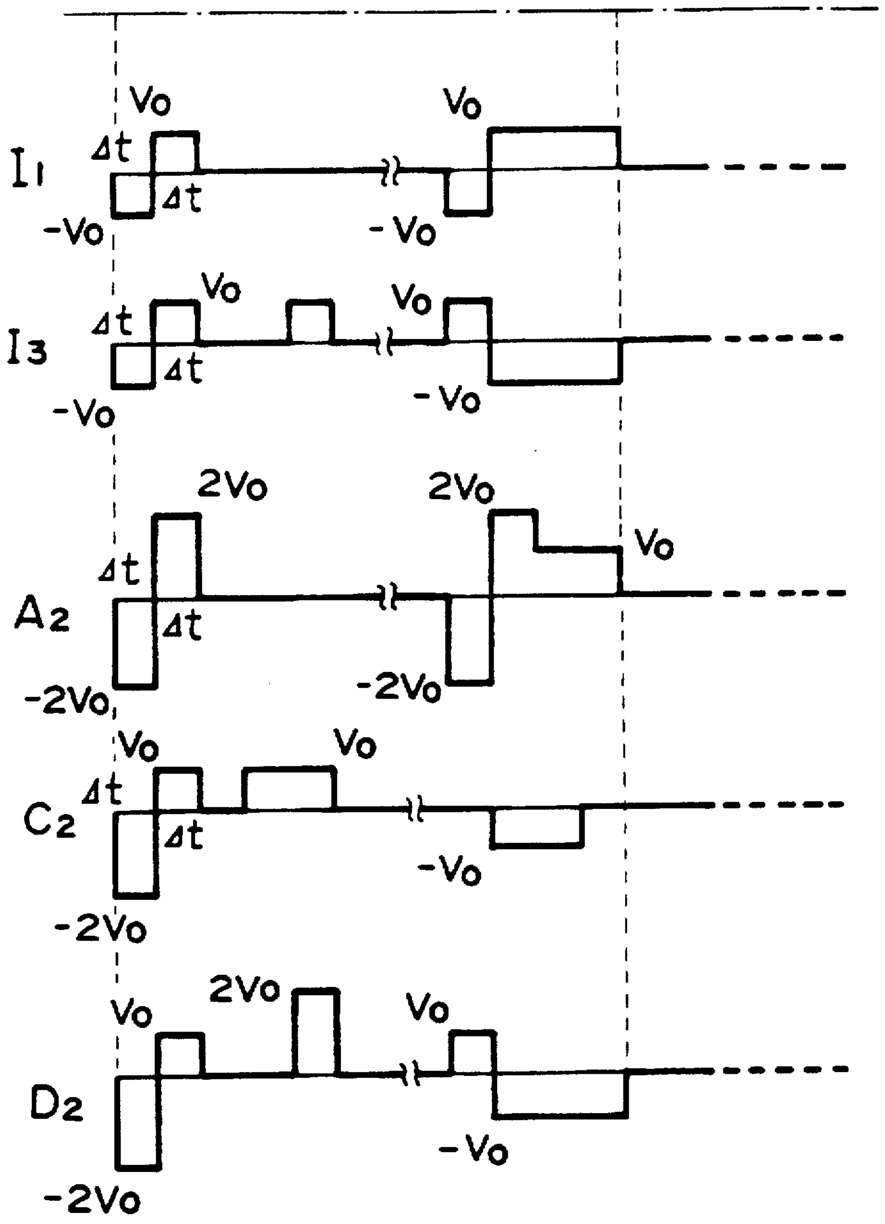
Figure 14A:
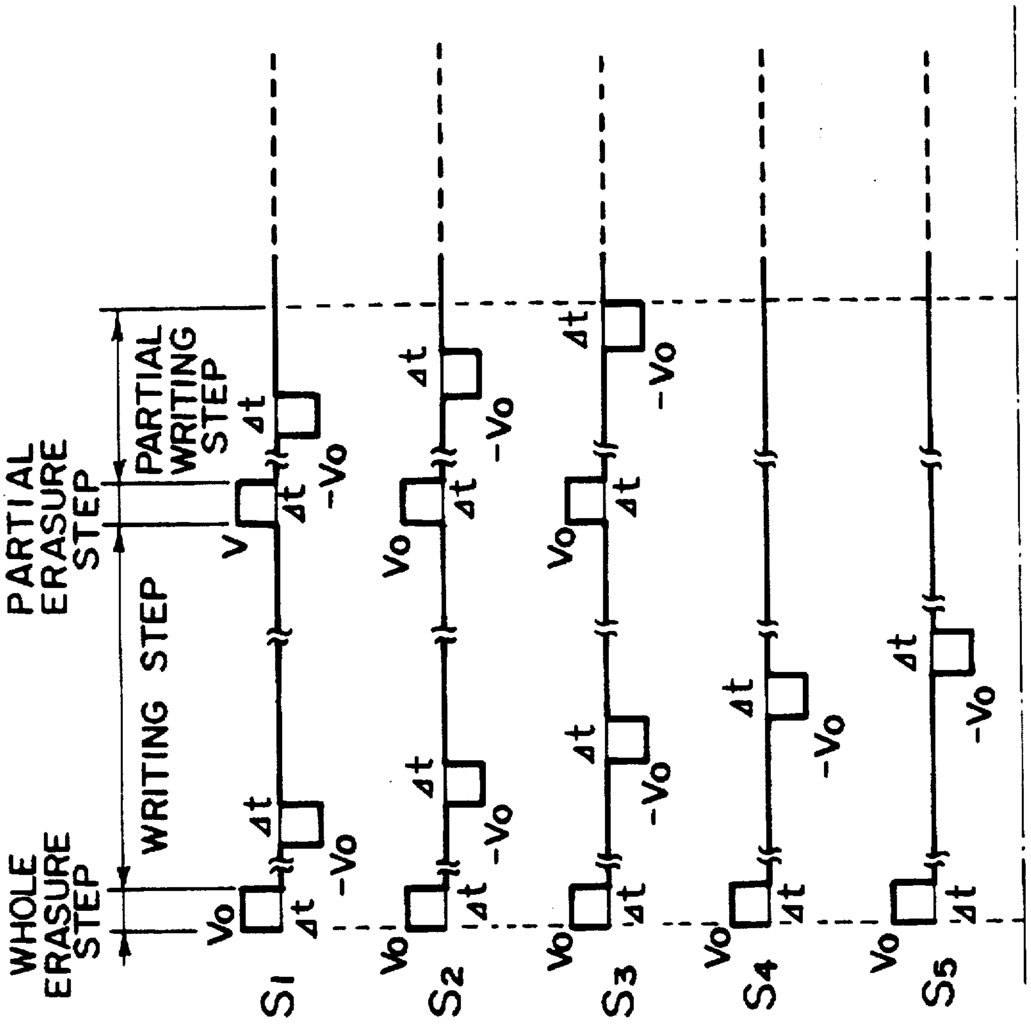
Figure 14B:
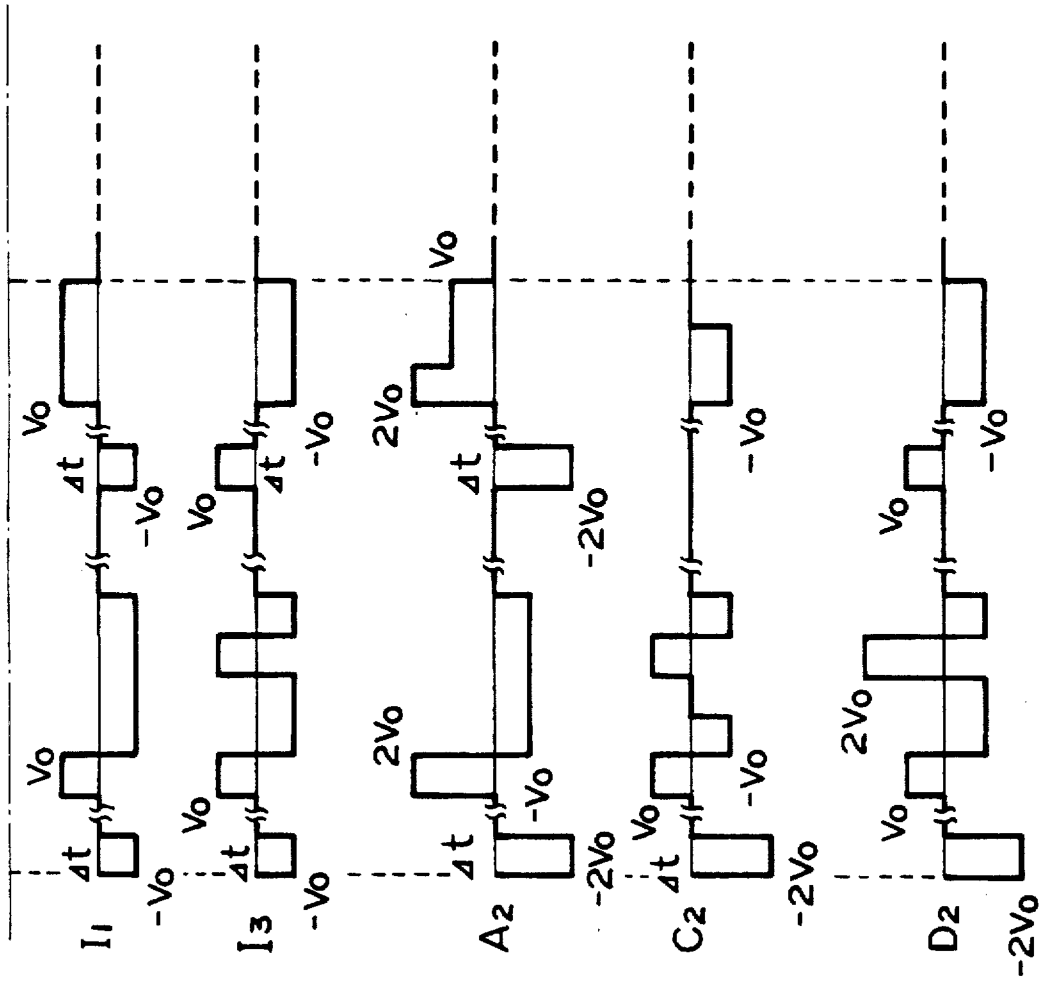

FIG. 13 (combination of FIGS. 13A and 13B) and FIG. 14 (combination of FIGS. 14A and 14B) show other examples of driving modes based on the present invention. In these driving modes, $V_0$ is set to such a value that the threshold voltage for changing orientations for a pulse width of $\Delta t$ is placed between $|V_0|$ and $|2V_0|$.

In the example shown in FIG. 13 (FIG. 13A and FIG. 13B), an electric signal of $+V_0$ is applied to the scanning lines and, in parallel therewith, an electric signal of $-V_0$ is applied to the data lines for erasing a picture. Immediately thereafter, in the writing step, scanning signals $S_1$, $S_2$ . . . , each of $-V_0$, are sequentially applied and, in phase with these scanning signals, information signals, each of $+V_0$, are applied to data lines, whereby a picture as shown in FIG. 11A is written in.

Next, in the partial erasure step, an electric signal of $-2V_0$ is applied to the picture elements which have been written in the previous step in the X-Y region shown in FIG. 11D, whereby the picture elements are erased at a time. (This example of one time erasure is shown in FIG. 13. However, successive erasure is also possible by applying an electric signal of $V_0$ successively to scanning lines as a scanning selection signal). Then, electric signals corresponding to new image information are applied to the X-Y region whereby the X-Y region is written as shown in FIG. 11D.

Figure 15:
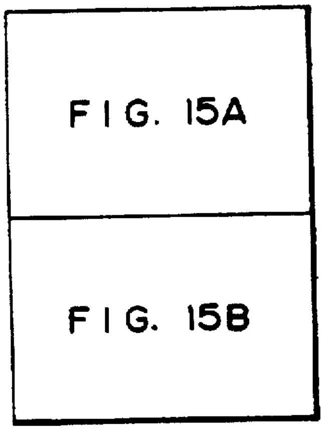
Figure 15A:
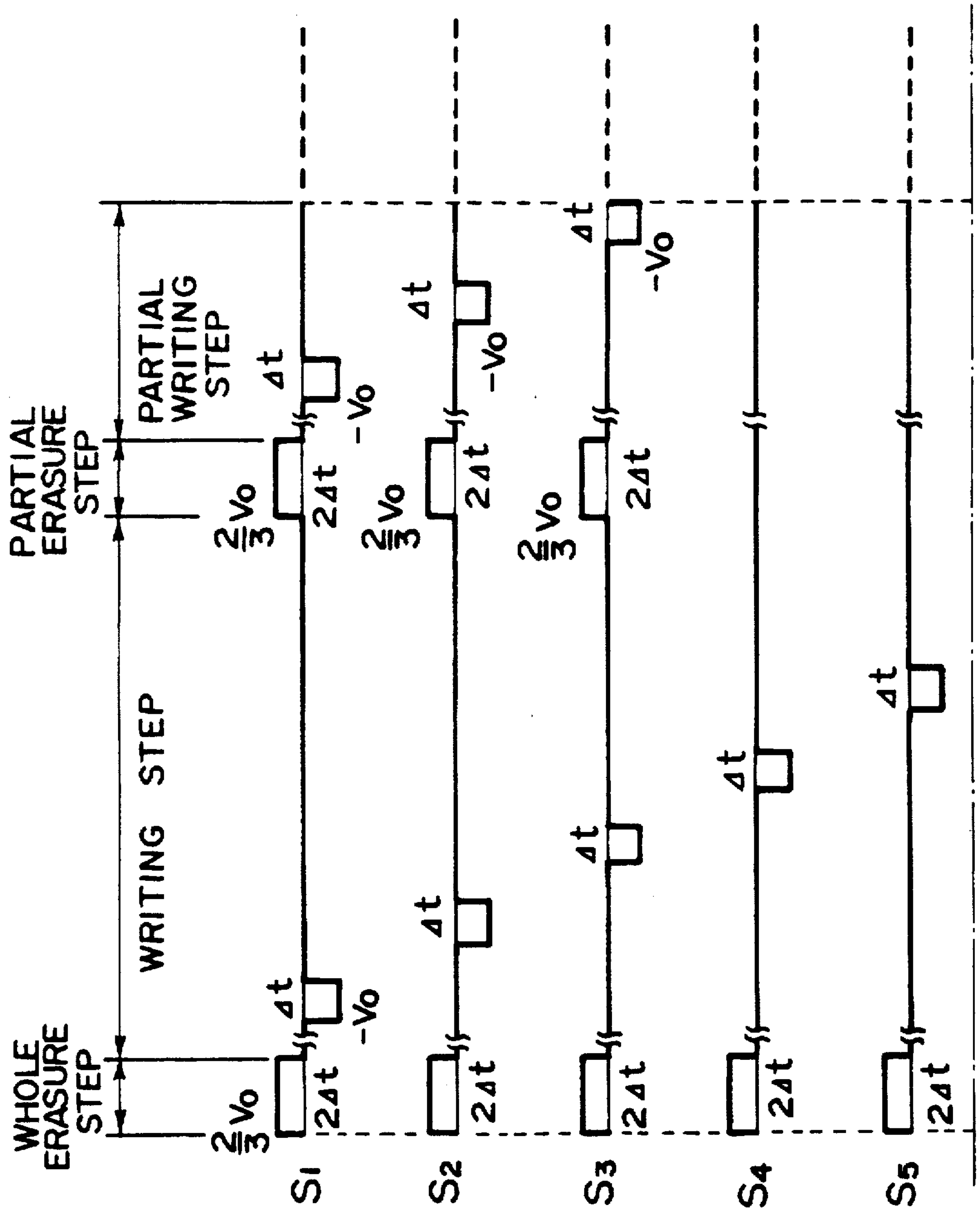
Figure 15B:
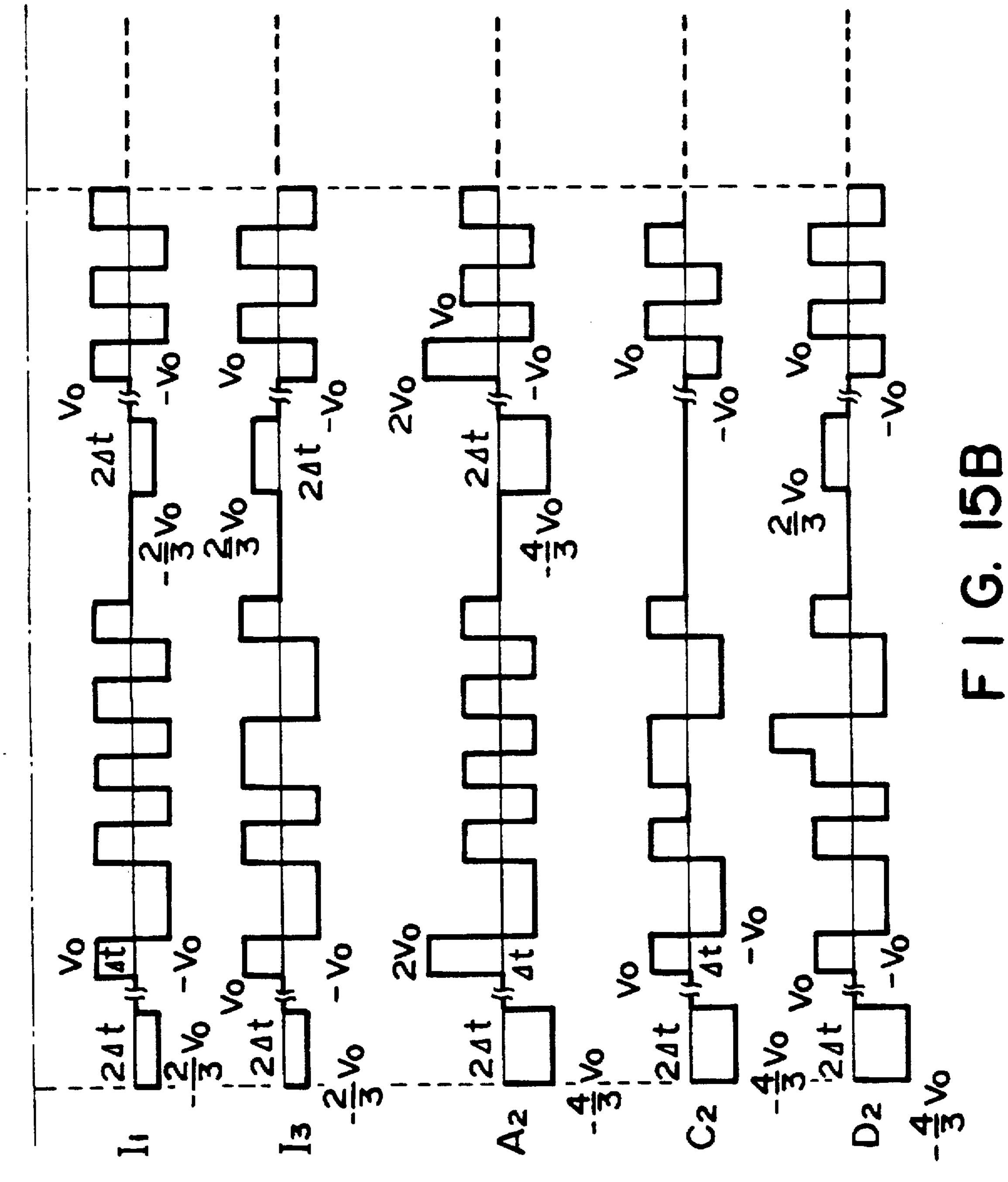

FIGS. 13 and 14 respectively show examples where no auxiliary signal is involved, whereas FIG. 15 (combination of FIGS. 15A and 15B) shows an example where an auxiliary signal is used. Voltage values in respective driving pulses are shown in the figure. In the example of FIG. 15, electric signals applied to scanning lines and data lines in the erasure step have polarities respectively opposite to those applied in the writing step, have magnitudes in terms of absolute values smaller ($\frac{2}{3}V_0$) than those of the latter and have larger pulse widths ($2\Delta t$) than those of the latter. This erasure mode is effective in a case where the threshold voltage depends on pulse widths and a threshold voltage $V_{th}^{2\Delta t}$ for a width of $2\Delta t$ satisfies a relationship of $V_{th}^{2\Delta t} \leq \frac{4}{3}V_0$.

In the partial erasure step, an electric signal of $-\frac{4}{3}V_0$ is applied to effect partial erasure. In the next partial writing step, a new image is written in the X-Y region.

Figure 17:
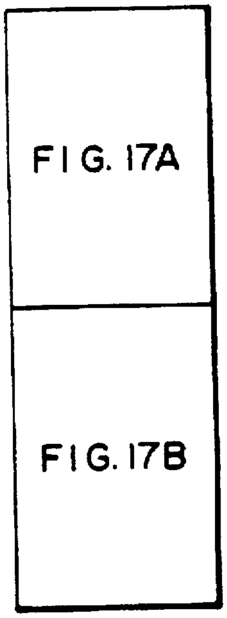
Figure 16A:
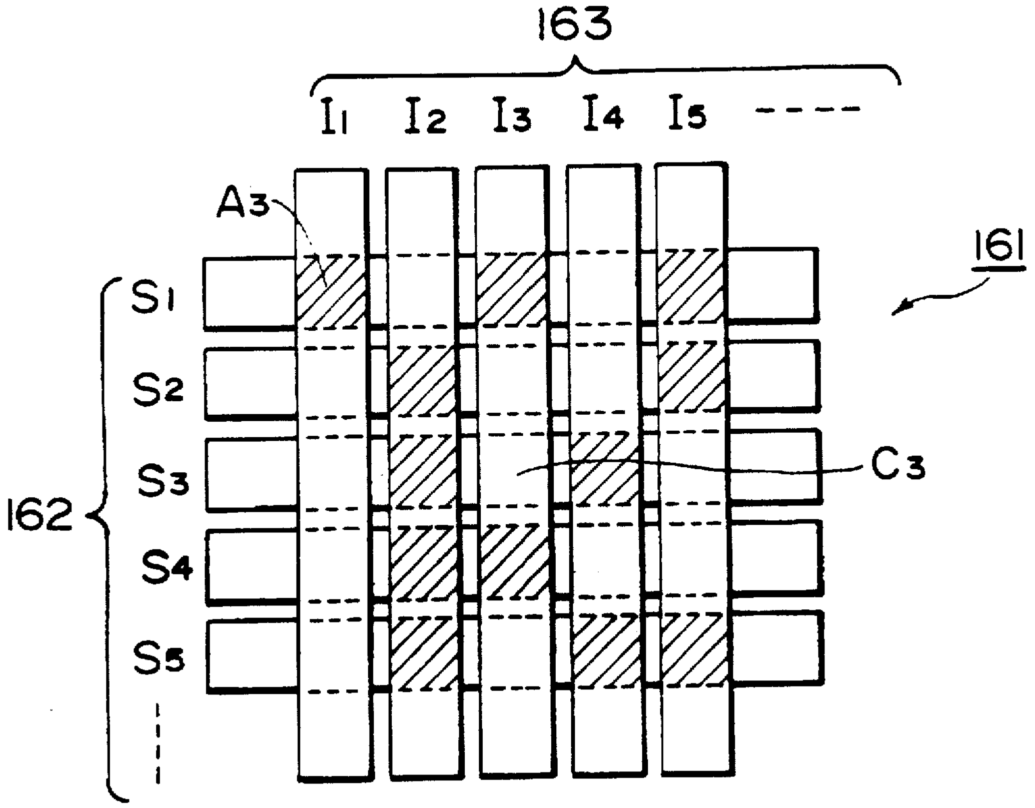
FIG. 16A is a plan view of an electrode arrangement in a different embodiment of the driving method according to the present invention, FIGS. 16B(*a*)–(*d*) illustrate waveforms of electric signals applied to electrodes in the different embodiment, FIGS. 16C(*a*)–(*d*) illustrate voltage waveforms in the different embodiment, FIGS. 17A and 17B in combination show voltage waveforms applied in time series in the different embodiment.
Figure 16B:
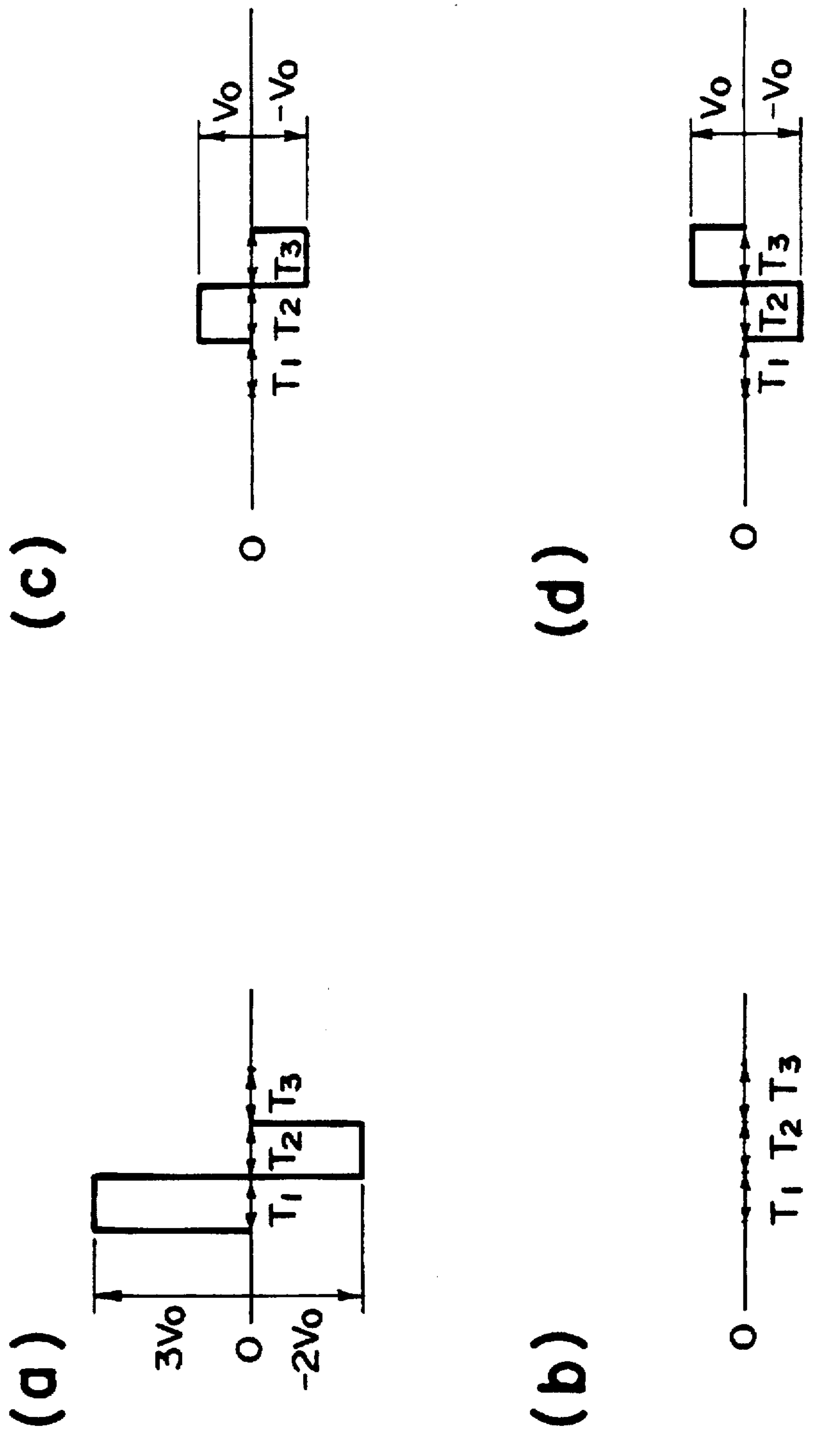
Figure 16C:
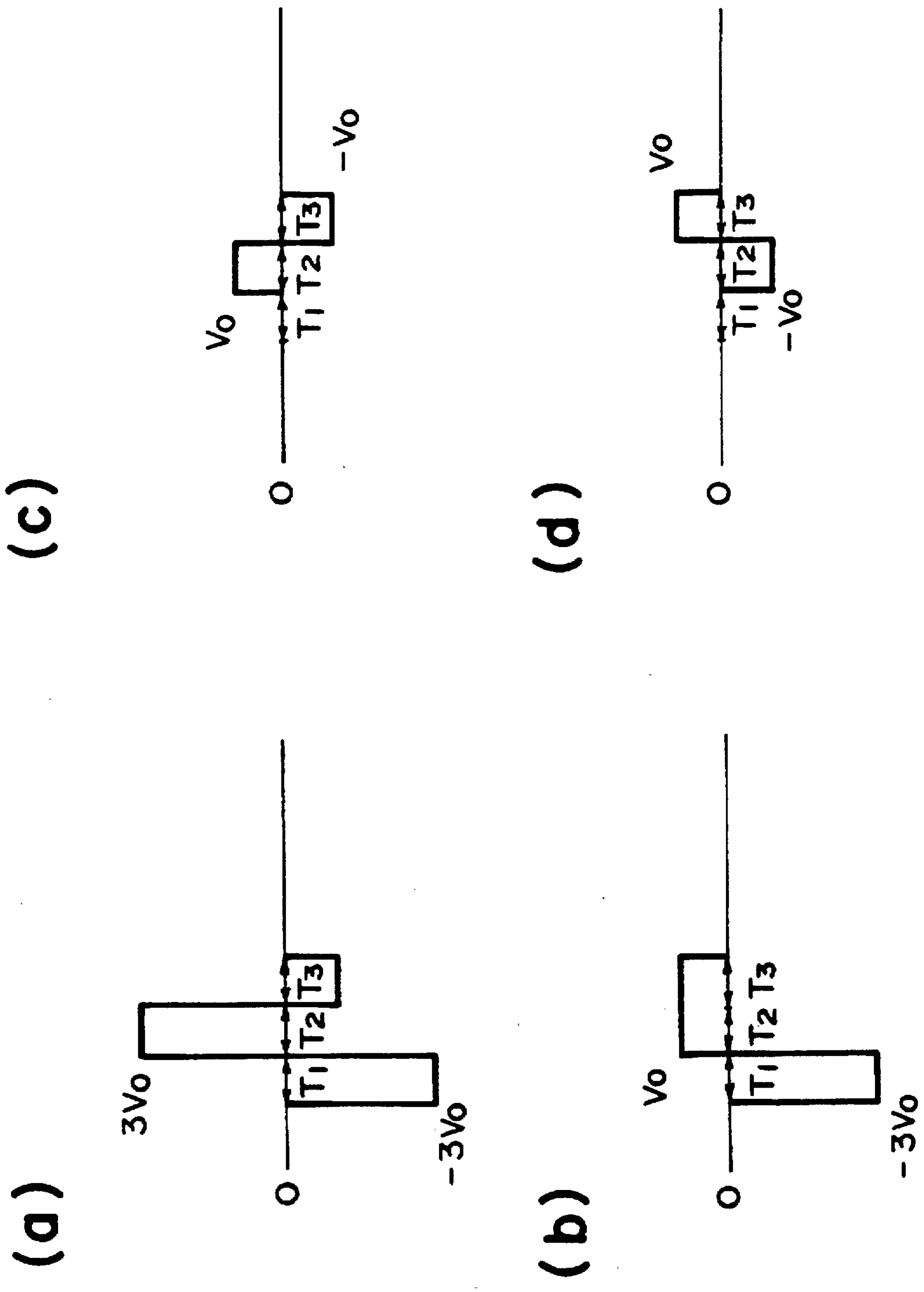
Figure 17A:
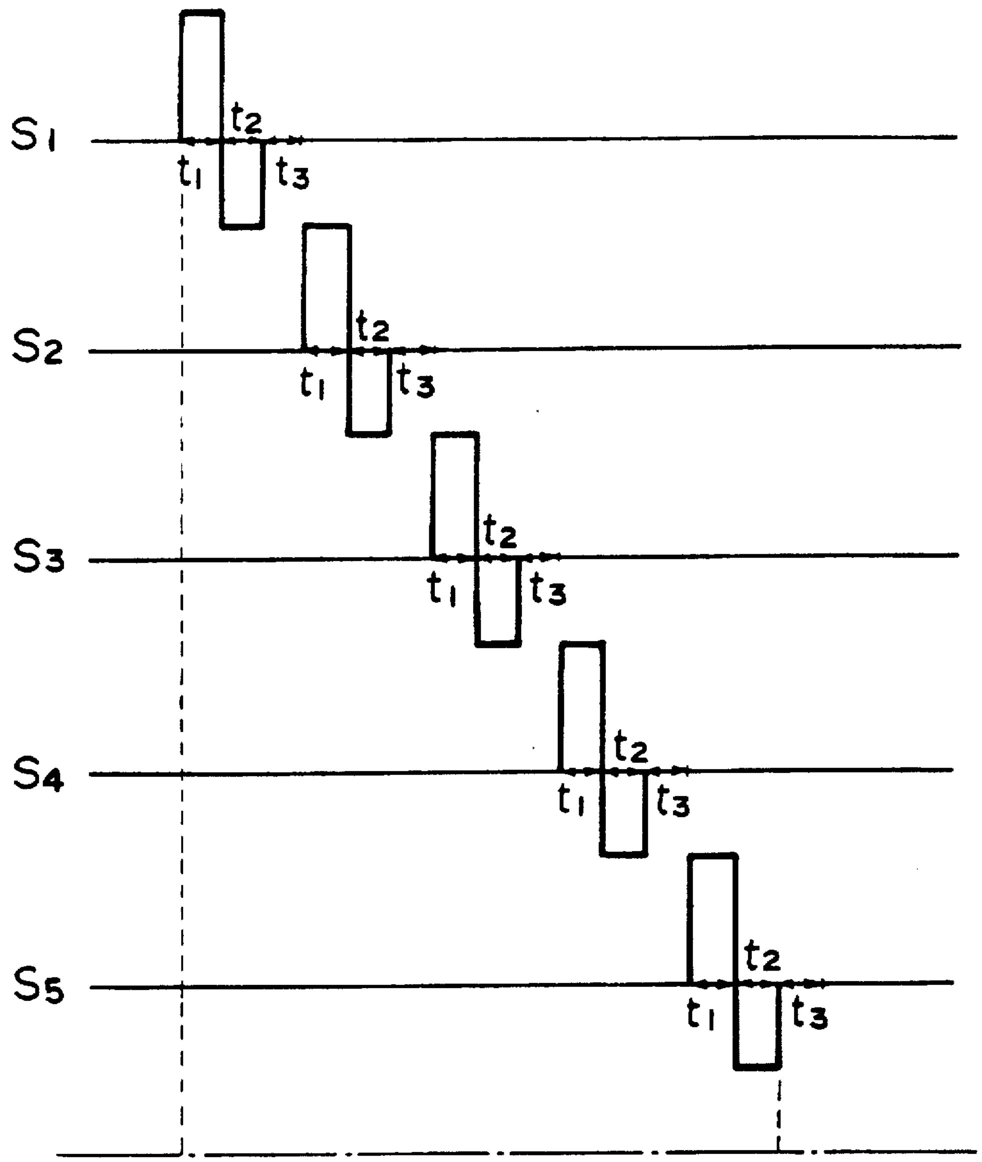
Figure 17B:
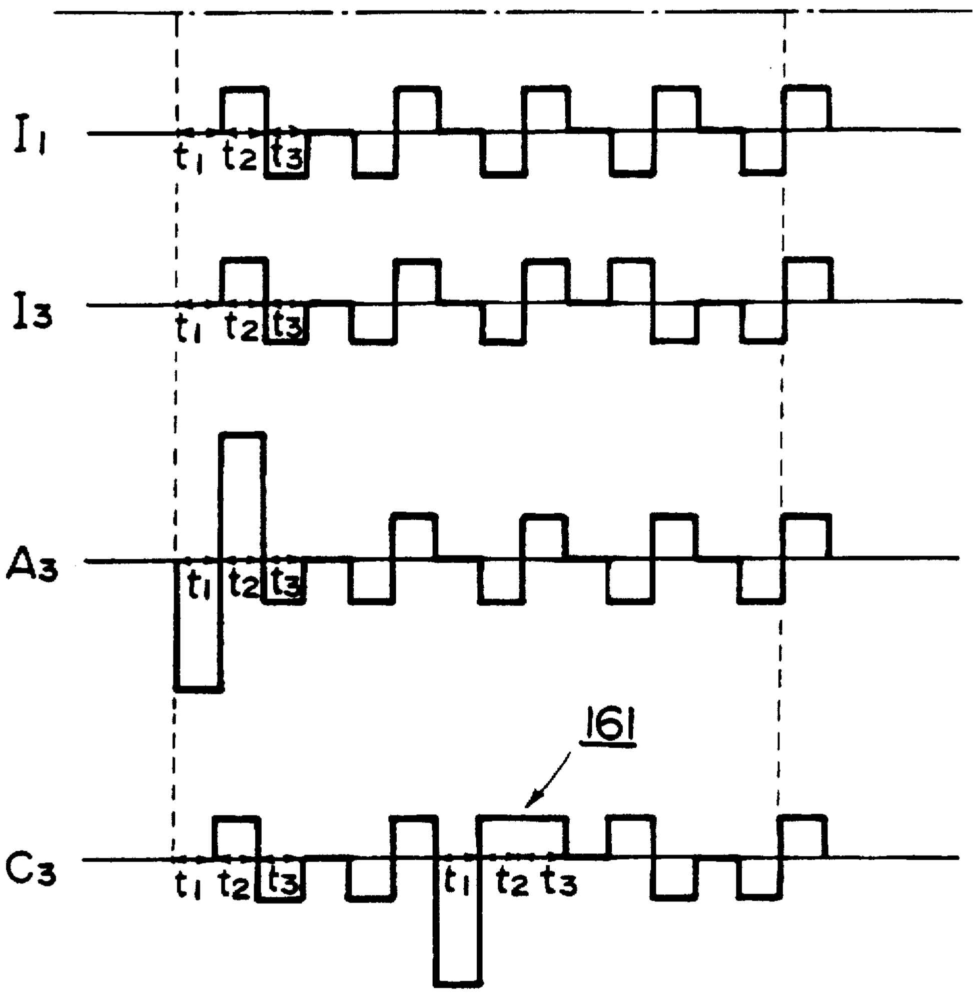

FIG. 16 (inclusive of FIGS. 16A, 16B and 16C) and FIG. 17 (combination of FIGS. 17A and 17B) illustrate another driving mode for an optical modulation device comprising: a writing step comprising a first phase wherein a voltage orienting the bistable optical modulation material to the first stable state is applied to picture elements on selected scanning lines among said plurality of picture elements, and a second phase wherein a voltage orienting the bistable optical modulation material to the second stable state is applied to a selected picture element among the picture elements on the selected scanning lines to write in the selected picture element, and a step of applying an alternating current to the written selected picture element.

A further preferred example of this driving mode is used for driving a liquid crystal device which comprises scanning lines sequentially and periodically selected based on scanning signals, data lines facing the scanning lines and selected based on predetermined information signals, and a bistable liquid crystal assuming a first stable state or a second stable state depending on an electric field applied thereto interposed between the scanning lines and data lines. The liquid crystal device is driven by applying to a selected scanning line an electric signal comprising a first phase $t_1$ providing one direction of an electric field by which the liquid crystal is oriented to the first stable state regardless of an electric signal applied to signal electrodes and a second phase $t_1$ having an auxiliary voltage assisting reorientation to the second stable state of the liquid crystal corresponding to electric signals applied to data lines, and a third step or phase $t_3$ of applying to data lines an electric signal having a voltage polarity opposite to that of the electric signal applied at the phase $t_2$ based on predetermined information.

A preferred embodiment according to this mode is explainer with reference to FIG. 16.

FIG. 16A schematically shows a cell 16 having picture elements arranged in a matrix which comprise scanning lines (scanning electrodes) 162, data lines (signal electrodes) 163 and a ferroelectric liquid crystal interposed therebetween. For the brevity of explanation, a case where two state signals of "white" and "black" are displayed is explained. It is assumed that hatched picture elements correspond to "black" and the other picture elements correspond to "white" in FIG. 16A.

FIGS. 16B(*a*) and 16B(*b*) show an electric signal (scanning selection signal) applied to a selected scanning line and an electric signal (scanning non-selection signal) applied to the other scanning lines (nonselected scanning lines), respectively. FIGS. 16B(*c*) and 16B(*d*) show an electric signal (information selection signal) applied to a selected (referred to as "black") data line and an electric signal (information non-selection signal) applied to a non-selected (referred to as "white") data line, respectively. In the FIGS. 16B(*a*)–16B(*d*), the abscissa represents time, and the ordinate a voltage, respectively. $T_1$, $T_2$ and $T_3$ in the writing step represent first, second and third phases, respectively. This example shows a case where $T_1=T_2=T_3$.

It is assumed herein that a threshold voltage for providing the first stable state (white) of the bistable liquid crystal for an application time of Δt be $-V_{th2}$, and a threshold voltage for providing the second stable state for an application time of Δt be $V_{th1}$. Then, the electric signal applied to the selected scanning line comprises voltages of $3V_0$ at phase (time) $T_1$, $-2V_0$ at phase (time) $T_2$ and 0 at phase (time) $T_3$ as shown in FIG. 16B(*a*). The other scanning lines are placed in grounded condition as shown in FIG. 16B(*b*) and the electric signal is 0. On the other hand, the electric signal applied to the selected data line comprises 0 at phase $T_1$, $V_0$ at phase $T_2$ and $-V_0$ at phase $T_2$ as shown in FIG. 16B(*c*), and the electric signal applied to the nonselected data line comprises 0 at phase $T_1$, $-V_0$ at phase $T_2$ and $+V_0$ at phase $T_3$ as shown in FIG. 16B(*d*). In this instance, the voltage $V_0$ is set to a desired value which satisfies $V_0<V_{th1}<3V_0$ and $-V_0>-V_{th2}>-3V_0$.

Voltage waveforms applied to respective picture elements when the above mentioned electric signals are given are shown in FIGS. 16C. FIGS. 16C(*a*) and 16C(*b*) show voltage waveforms applied to picture elements where "black" and "white" are displayed, respectively, on the selected scanning line. FIGS. 16C(*c*) and 16C(*d*) respectively show voltage waveforms applied to picture elements on the nonselected scanning lines.

As shown in FIG. 16C, a voltage $-3V_0$ exceeding the threshold voltage $-V_{th2}$ is applied to all the picture elements on the selected scanning line at phase $T_1$, whereby these picture elements are once rendered white. In the second phase $T_2$, a voltage $3V_0$ exceeding the threshold voltage $V_{th1}$ is applied to the picture elements which are to be displayed as "black", whereby the other optically stable state ("black") is attained. Further, the voltage applied to the picture elements which are to be displayed as "white" is $V_0$ not exceeding the threshold voltage, whreby the same optically stable state is maintained.

On the other hand, on the nonselected scanning lines, the voltage applied to all the picture elements is ±V or 0, each not exceeding the threshold voltage. Accordingly the liquid crystal at the respective picture elements retains its orientation which has been obtained when the picture elements have been last scanned. In other words, when a scanning line is selected, all the picture elements on the scanning line is uniformly oriented to one optically stable state ("white") at phase $T_1$ and selected picture elements are transformed into the other optically stable state ("black"), whereby one line is written. The thus obtained signal or display state is retained even after writing steps for one frame is finished and until subsequent scanning.

FIG. 17 (combination of FIGS. 17A and 17B) shows an example of the above mentioned driving signals in time series. $S_1$ to $S_5$ represent electric signals applied to scanning lines; $I_1$ and $I_3$ represent electric signals applied to data lines; and $A_3$ and $C_3$ represent voltage waveforms applied to picture elements $A_3$ and $C_3$, respectively, shown in FIG. 16A.

As has been described above, a reversal of orientation states (cross talk) can occur due to application of a weak electric field for a long period. In a preferred embodiment, however, the reversal of orientation states can be prevented by applying a signal capable of preventing continual application of a weak electric field in one direction.

FIGS. 16B(*c*) and 16B(*d*) illustrate a preferred embodiment for the above purpose wherein a signal having a polarity opposite to that of an information signal ("black" in FIG. 16B(*c*) and "white" in FIG. 16B(*d*)) applied to a data line at phase $T_2$ is applied to the data line at phase $T_3$. In a case where a pattern shown in FIG. 16A is intended to be displayed, for example, by a driving method not having such phase $T_3$, picture element $A_3$ is made "black" on scanning of the scanning line $S_1$, but it is highly possible that the picture element $A_3$ will be switched sometime to "white" because an electric signal or voltage of $-V_0$ is continuously applied to the signal electrode $I_1$ during the steps for scanning of the scanning electrode $S_2$ and so on and the voltage is continuously applied to the picture element $A_3$ as it is.

The whole picture is once uniformly rendered "white" at the first phase $T_1$ and then "black" is written into picture elements corresponding to information at the second phase $T_2$ in the scanning. In this example, the voltage for providing "white" at phase $T_1$ is $-3V_0$ and the application time is Δt. Further, the voltage for writing "black" at phase $T_2$ is $3V_0$ and the application time is also Δt. The voltage applied to the respective picture elements except at the scanning time is $|\pm V_0|$ to the maximum, and the longest time during which the maximum voltage is 2Δt as shown at part 161 in FIG. 17. Thus cross talk does not occur at all, whereby a displayed information is retained semipermanently after the scanning of the whole picture is once completed. For this reason, a refreshing step as required in a display device using a TN liquid crystal having no bistability is not required at all.

The optimum length of the third phase $T_3$ depends on the magnitude of the voltage applied to the data line at this phase. When a voltage having a polarity opposite to that of the information signal is applied, it is preferred that the time length is shorter for a larger voltage and longer for a shorter voltage. When the time is longer, it follows that a longer time is required for scanning the whole picture. Therefore, $T_3$ is preferably set to satisfy $T_3 \leqq T_2$.

The driving method according to the present invention can be widely applied in the field of optical shutters and display such as liquid crystal-optical shutters and liquid crystal TV sets.

Hereinbelow, the present invention will be explained with reference to working examples.

EXAMPLE 1

A pair of electrode plates each comprising a glass substrate and a transparent electrode pattern of ITO (Indium-Tin-Oxide) formed thereon were provided. These electrodes were capable of giving a 500×500 matrix electrode structure. On the electrode pattern of one of the electrode plates was formed a polyimide film of about 300Å in thickness by spin coating. The polyimide face of the electrode plate was rubbed with a roller about which a suede cloth was wound. The electrode plate was bonded to the other electrode plate which was not coated with a polyimide film, thereby to form a cell having a gap of about 1.6μ. Into the cell was injected a ferroelectric crystal of decyloxybenzylidene-p'-amino-2-methylbutyl cinnamate (DOBAMBC) under hot-melting state, which was then gradually cooled to form a uniform monodomain of SmC phase.

The thus formed cell was held at a controlled temperature of 70° C. and driven by line-by-line scanning according to the driving mode explained with reference to FIGS. 3 and 4 under the conditions of $V_0$=10 volt, and $T_1=T_2=\Delta t$=80 μsec, whereby extremely good image was obtained.

EXAMPLE 2

Writing of image was conducted in the same manner as in Example 1 except that the driving mode shown in FIG. 7 was used instead of the mode in Example 1, whereby good image was obtained.

EXAMPLE 3

Line-by-line scanning was carried out in the same manner as in Example 1 except that the driving waveforms shown in FIG. 12 was used, whereby extremely good image was formed. Then, a part of the image was rewritten according to driving waveforms shown in FIG. 12, whereby good partially-rewritten image was obtained.

EXAMPLE 4

Line-by-line scanning was carried out in the same manner as in Example 1 except that the waveforms shown in FIGS. 16 and 17 were used under the conditions of $V_0$=10 volt, and $T_1=T_2=T_3=\Delta t$=50 μsec, whereby extremely good image was formed.

What is claimed is:

1. A driving method for driving an optical modulation device comprising: a plurality of picture elements arranged in the form of a matrix having a plurality of rows and a plurality of columns defined by the intersections of scanning electrodes arranged in rows and signal electrodes arranged in columns, and a chiral smectic liquid crystal having a memory function; the picture elements in each row being selectively supplied with either a voltage for orienting the liquid crystal to one display state, or another voltage for orienting the liquid crystal to another display state; said driving method comprising the steps of:

applying periodically a scanning selection signal comprising a former pulse of a first voltage and a latter pulse of a second voltage different from the first voltage to a particular one of the scanning electrodes to select that particular scanning electrode;

applying data signals to the signal electrodes, each data signal comprising an information pulse for selecting a display state of a picture element on the particular scanning electrode and a second pulse having a pulse width shorter than that of the latter pulse and applied in a period different from that for the latter pulse, each data signal thereby providing a pulse train of voltage applied to picture elements at intersections of scanning electrodes not receiving the scanning selection signals and signal electrodes including at least one pulse having a pulse width shorter than that of the latter voltage pulse, such that the picture elements on the particular scanning electrode supplied with the former voltage pulse are non-selectively erased into an erased state and a picture element on the particular scanning electrode supplied with the latter voltage pulse is placed in either the one display state or the other display state depending on the information pulse; and applying an AC voltage which does not change display states of the picture elements to the picture elements on scanning electrodes not receiving the scanning selection signal.

2. An optical modulation apparatus, comprising an optical modulation device having:

a plurality of picture elements arranged in the form of a matrix having a plurality of rows and a plurality of columns;

scanning electrodes arranged in rows and signal electrodes arranged in columns together defining said matrix of picture elements;

a liquid crystal having a memory function; and driving means for:

a) applying periodically a scanning selection signal comprising a first voltage pulse and a second voltage pulse to a particular one of the scanning electrodes to select that particular scanning electrode, and applying data signals to the signal electrodes, each data signal comprising an information pulse for selecting a display state of a picture element on the particular scanning electrode and a second pulse having a pulse width shorter than that of the second pulse and applied in a period different from that for the second pulse, each data signal thereby providing a pulse train of voltage applied to picture elements at intersections of scanning electrodes not receiving the scanning selection signals and signal electrodes including at least one pulse having a pulse width shorter than that of the second voltage pulse, such that the picture elements on the particular scanning electrode supplied with the first voltage pulse are non-selectively erased into an erased state and a picture element on the particular scanning electrode supplied with the second voltage pulse is placed in either said one display state or the other display state depending upon the information pulse; and b) applying an AC voltage which does not change display states of the picture elements to the picture elements on scanning electrodes not receiving the scanning selection signal.

3. An optical modulation apparatus, comprising:

an optical modulation device having:

a plurality of picture elements arranged in the form of a matrix having a plurality of rows and a plurality of columns;

scanning electrodes arranged in rows and signal electrodes arranged in columns together defining said matrix of picture elements; and a liquid crystal having a memory function disposed between the scanning electrodes and signal electrodes; and driving means for:

a) applying periodically a scanning selection signal comprising a first voltage pulse and a second voltage pulse different from the first voltage pulse to a particular one of the scanning electrodes to select that particular scanning electrode, and applying data signals to the signal electrodes, each data signal comprising an information pulse for selecting a display state of a picture element on the particular scanning electrode and a second pulse having a pulse width shorter than that of the second voltage pulse and applied in a period different from that of the second voltage pulse, so that the picture elements on the particular scanning electrode supplied with the first voltage pulse are non-selectively erased into an erased state and the picture elements on the particular scanning electrode supplied with the second voltage pulse are respectively selected in display states depending on the information pulses applied in synchronism with the second voltage pulse; and b) applying an AC voltage which does not change the selected display states of the picture elements on the particular scanning electrode to the pixels when the particular scanning electrode is not supplied with the scanning selection signal.

4. A driving method for driving an optical modulation device comprising: a plurality of picture elements arranged in the form of a matrix having a plurality of rows and a plurality of columns defined by the intersections of scanning electrodes arranged in rows and signal electrodes arranged in columns, and a liquid crystal having a memory function, the picture elements in each row being selectively supplied with either a voltage for orienting the liquid crystal to one display state, or another voltage for orienting the liquid crystal to another display state, said driving method comprising the steps of:

applying periodically a scanning selection signal comprising a former voltage pulse of a first voltage and a latter voltage pulse of a second voltage different from the first voltage to a particular one of the scanning electrodes to select that particular scanning electrode;

applying data signals to the signal electrodes, each data signal comprising an information pulse for selecting a display state of a picture element on the particular scanning electrode and a second pulse having a pulse width shorter than that of the latter pulse and applied in a period different from that for the latter pulse, so that the picture elements on the particular scanning electrode supplied with the former voltage pulse are non-selectively erased into an erased state and a picture element on the particular scanning electrode supplied with the latter voltage pulse is placed in either the one display state or the other display state depending on the information signal, and so that the picture elements at intersections of scanning electrodes not receiving the scanning selection signal and the signal electrodes are supplied with a pulse train of voltage including at least one pulse having a pulse width shorter than that of the second voltage pulse; and applying an AC voltage which does not change display states to the picture elements on scanning electrodes not receiving the scanning selection signal.

5. An optical modulation apparatus, comprising:

an optical modulation device having:

a plurality of picture elements arranged in the form of a matrix having a plurality of rows and a plurality of columns;

scanning electrodes arranged in rows and signal electrodes arranged in columns defining said matrix of picture elements; and a liquid crystal having a memory function; and driving means for:

a) applying periodically a scanning selection signal comprising a first voltage pulse and a second voltage pulse to a particular one of the scanning electrodes to select that particular scanning electrode, and applying data signals to the signal electrodes, each data signal comprising an information pulse for selecting a display state of a picture element on the particular scanning electrode and a second pulse having a pulse width shorter than that of the second voltage pulse and applied in a period different from that of the second voltage pulse, so that the picture elements on the particular scanning electrode supplied with the first voltage pulse are non-selectively erased into an erased state and a picture element on the particular scanning electrode supplied with the second voltage pulse is placed in either one display state or another display state depending upon the information pulse, and so that the picture elements at intersections of scanning electrodes not receiving the scanning selection signal and the signal electrodes are supplied with a pulse train of voltage including at least one pulse having a pulse width shorter than that of the second voltage pulse; and b) applying an AC voltage which does not change display states to the picture elements on scanning electrodes not receiving the scanning selection signal.

6. An optical modulation apparatus, comprising:

an optical modulation device having:

a plurality of picture elements arranged in the form of a matrix having a plurality of rows and a plurality of columns;

scanning electrodes arranged in rows and signal electrodes arranged in columns defining said matrix of picture elements; and a liquid crystal having a memory function disposed between the scanning electrodes and signal electrodes; and driving means for:

a) applying periodically a scanning selection signal comprising a first voltage pulse and a second voltage pulse different from the first voltage pulse to a particular one of the scanning electrodes to select that particular scanning electrode, and applying data signals to the signal electrodes, each data signal comprising an information pulse for selecting a display state of a picture element on the particular scanning electrode and a second pulse having a pulse width shorter than that of the second voltage pulse and applied in a period different from that of the second voltage pulse, so that the picture elements on the particular scanning electrode supplied with the first voltage pulse are non-selectively erased into an erased state and the picture elements on the particular scanning electrode supplied with the second voltage pulse are respectively selected in display states depending on the information pulses applied in synchronism with the second voltage pulse; and b) applying an AC voltage which does not change the selected display states of the picture elements on the particular scanning electrode to the pixels when the particular scanning electrode is not supplied with the scanning selection signal, said AC voltage comprising a pulse train including at least one pulse having a pulse width shorter than that of said second voltage pulse.

* * * * *

UNITED STATES PATENT AND TRADEMARK OFFICE

CERTIFICATE OF CORRECTION

PATENT NO. : 5,757,350

DATED : May 26, 1998

INVENTOR(S): JUNICHIRO KANBE ET AL.

It is certified that error appears in the above-identified patent and that said Letters Patent is hereby corrected as shown below:

COLUMN 1

Line 35, "sianal" should read --signal--.

COLUMN 5

Line 10, "a unwound" should read --and unwound--;
Line 14, "anisotropy-between" should read --anisotropy between--.

COLUMN 6

Line 17, "FIG. 3B(a)" should read --FIGS. 3B(a)--;
Line 48, "FIGS. 3C." should read --FIGS. 3C(a)-(d).--.

COLUMN 7

Line 1, "scannina" should read --scanning--;
Line 12, "4(combination" should read --4 (combination--;
Line 42, "hiaher" should read --higher--.

COLUMN 9

Line 55, "FIG. 11B(a)" should read --FIGS. 11B(a)--;
Line 64, "FIG. 11B(a)-11B(d)," should read --FIGS. 11B(a)-11B(d)--.

UNITED STATES PATENT AND TRADEMARK OFFICE
CERTIFICATE OF CORRECTION

PATENT NO. : 5,757,350

DATED : May 26, 1998

INVENTOR(S): JUNICHIRO KANBE ET AL.

It is certified that error appears in the above-identified patent and that said Letters Patent is hereby corrected as shown below:

COLUMN 10

Line 5, "(white)" should read --("white")--;
Line 8, "-$V_{th1}$." should read --$V_{th1}$.--
Line 11, "grownded" should read --grounded--;
Line 22, "FIGS. 11C." should read --FIGS. 11C(a)-(d).--

COLUMN 12

Line 45, "explainer" should read --explained--.

COLUMN 13

Line 2, "(white)" should read --("white")--;
Line 20, "FIGS. 16C." should read --FIGS. 16C(a)-(d).--;
Line 25, "FIG. 16C" should read --FIGS. 16C(a)-(d)--;
Line 35, "whreby" should read --whereby--.

COLUMN 15

Line 4, "was used," should read --were used,--;
Line 63, "and driving" should read --and ¶ driving--.

UNITED STATES PATENT AND TRADEMARK OFFICE

CERTIFICATE OF CORRECTION

PATENT NO. : 5,757,350

DATED : May 26, 1998

INVENTOR(S): JUNICHIRO KANBE ET AL.

It is certified that error appears in the above-identified patent and that said Letters Patent is hereby corrected as shown below:

COLUMN 17

Line 41, "and driving" should read --and ¶ driving--.

Signed and Sealed this

Fourth Day of May, 1999

Attest:

Q. TODD DICKINSON

Attesting Officer

*Acting Commissioner of Patents and Trademarks*